US009652561B2

United States Patent
Sato et al.

(10) Patent No.: US 9,652,561 B2
(45) Date of Patent: May 16, 2017

(54) METHOD, SYSTEM AND PROGRAM FOR PROCESSING INPUT DATA TO FACILITATE SELECTION OF A CORRESPONDING TAG CANDIDATE

(75) Inventors: Tatsuhito Sato, Tokyo (JP); Tomohiko Gotoh, Kanagawa (JP); Shunsuke Mochizuki, Tokyo (JP)

(73) Assignee: Sony Corporation (JP)

( * ) Notice: Subject to any disclaimer, the term of this patent is extended or adjusted under 35 U.S.C. 154(b) by 259 days.

(21) Appl. No.: 13/618,746

(22) Filed: Sep. 14, 2012

(65) Prior Publication Data

US 2013/0088499 A1   Apr. 11, 2013

(30) Foreign Application Priority Data

Oct. 7, 2011   (JP) .................................. 2011-222538

(51) Int. Cl.
    *G06F 17/30*   (2006.01)

(52) U.S. Cl.
    CPC .... *G06F 17/30997* (2013.01); *G06F 17/3097* (2013.01); *G06F 17/30961* (2013.01)

(58) Field of Classification Search
    CPC .............. G06F 17/20; G06F 17/30864; G06F 17/30867; G06F 17/3087; G06F 17/30755; G06F 17/30244; G06F 17/30247; G06F 17/30274; G06F 17/30283; G06F 17/30345; G06F 17/30572; G06F 17/30589; G06F 17/30613
    See application file for complete search history.

(56) References Cited

U.S. PATENT DOCUMENTS

| | | | |
|---|---|---|---|
| 2009/0129683 A1* | 5/2009 | Nitta | 382/227 |
| 2010/0083173 A1* | 4/2010 | Germann et al. | 715/810 |
| 2011/0040622 A1* | 2/2011 | Lucovsky et al. | 705/14.49 |
| 2011/0099493 A1* | 4/2011 | Yu et al. | 715/764 |
| 2011/0103699 A1* | 5/2011 | Ke et al. | 382/209 |
| 2011/0144995 A1* | 6/2011 | Bangalore et al. | 704/251 |
| 2011/0173190 A1* | 7/2011 | van Zwol | G06F 17/30265 707/723 |
| 2011/0286630 A1* | 11/2011 | Harder | G06T 15/08 382/103 |
| 2012/0144316 A1* | 6/2012 | Deng et al. | 715/751 |

FOREIGN PATENT DOCUMENTS

JP   2007-122562 A   5/2007

\* cited by examiner

*Primary Examiner* — Mark Zimmerman
*Assistant Examiner* — Nurun N Flora
(74) *Attorney, Agent, or Firm* — Lerner, David, Littenberg, Krumholz & Mentlik, LLP

(57) ABSTRACT

According to an illustrative embodiment an information processing system is provided. The system includes a processor for determining one or more candidate tags based on input data, the candidate tags being included within a hierarchical structure; and a display for displaying the candidate tags in a manner indicative of the candidate tags' positions in the hierarchical structure.

15 Claims, 23 Drawing Sheets

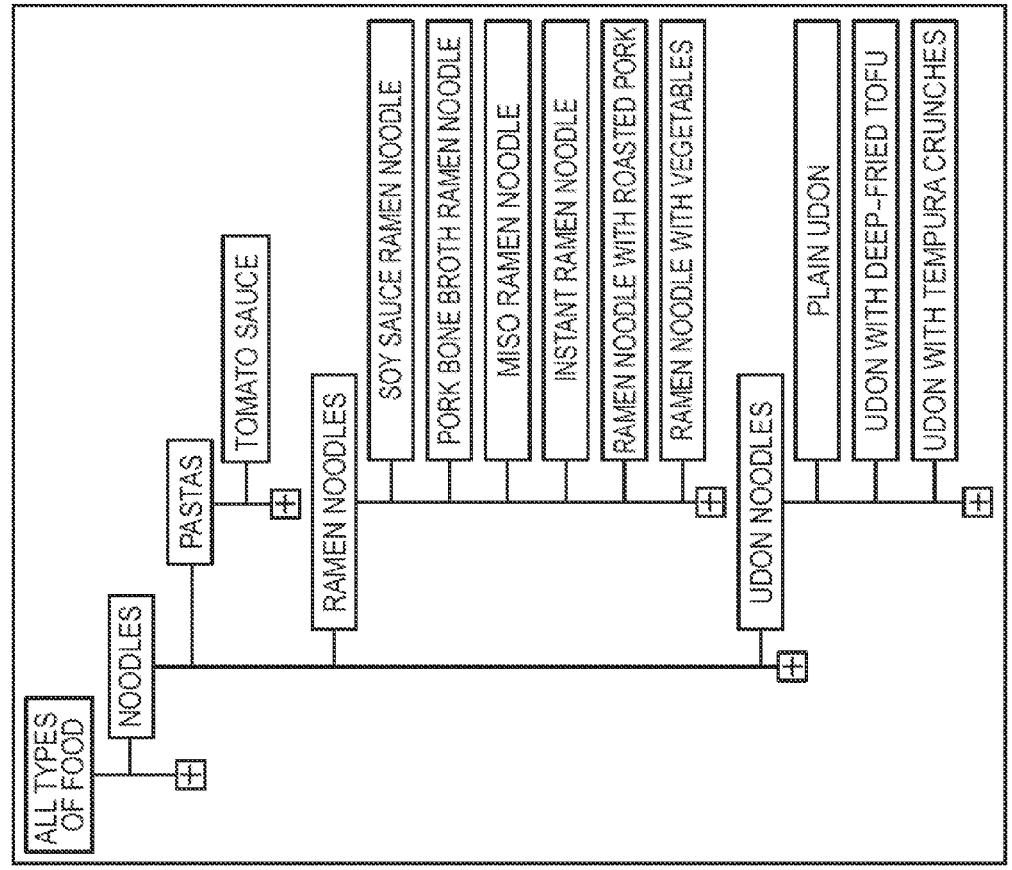
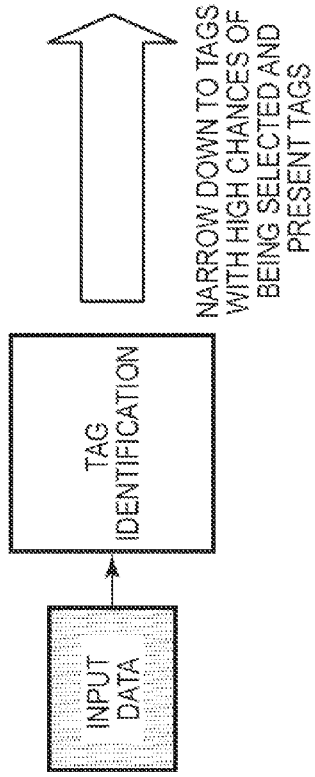
FIG. 2

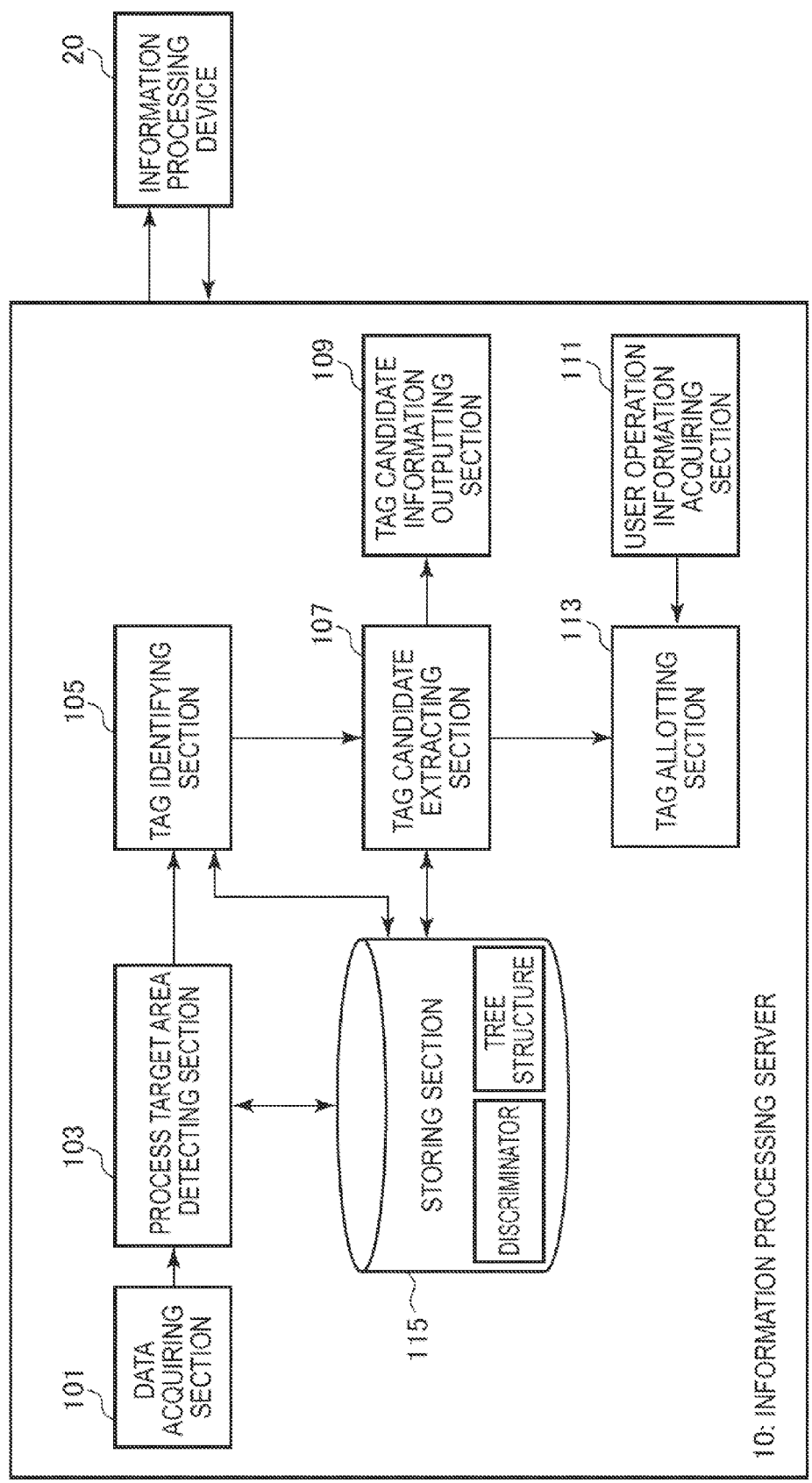

FIG. 6

| NAMES (SMALL CLASS) | MIDDLE CLASS | LARGE CLASS |
|---|---|---|
| POLISHED RICE | RICE, RICE BOILED WITH SEASONINGS | RICE, RICE BOWL, SUSHI |
| RICE OTHER THAN POLISHED RICE | RICE, RICE BOILED WITH SEASONINGS | RICE, RICE BOWL, SUSHI |
| RICE BOILED WITH SEASONINGS | RICE, RICE BOILED WITH SEASONINGS | RICE, RICE BOWL, SUSHI |
| RICE WITH TEA | RICE WITH TEA, RICE PORRIDGE | RICE, RICE BOWL, SUSHI |
| RICE PORRIDGE, RICE GRUEL | RICE WITH TEA, RICE PORRIDGE | RICE, RICE BOWL, SUSHI |
| HAND-FORMED SUSHI | SUSHI | RICE, RICE BOWL, SUSHI |
| MIXED SUSHI | SUSHI | RICE, RICE BOWL, SUSHI |
| RICE BALL | RICE BALL | RICE, RICE BOWL, SUSHI |
| FRIED RICE | PILAF, FRIED RICE | RICE, RICE BOWL, SUSHI |
| PILAF | PILAF, FRIED RICE | RICE, RICE BOWL, SUSHI |
| RICE BOWL WITH TOPPED TEMPURA | RICE BOWL | RICE, RICE BOWL, SUSHI |
| RICE BOWL WITH TOPPED WESTERN CUISINE | RICE BOWL | RICE, RICE BOWL, SUSHI |
| . . . | . . . | . . . |

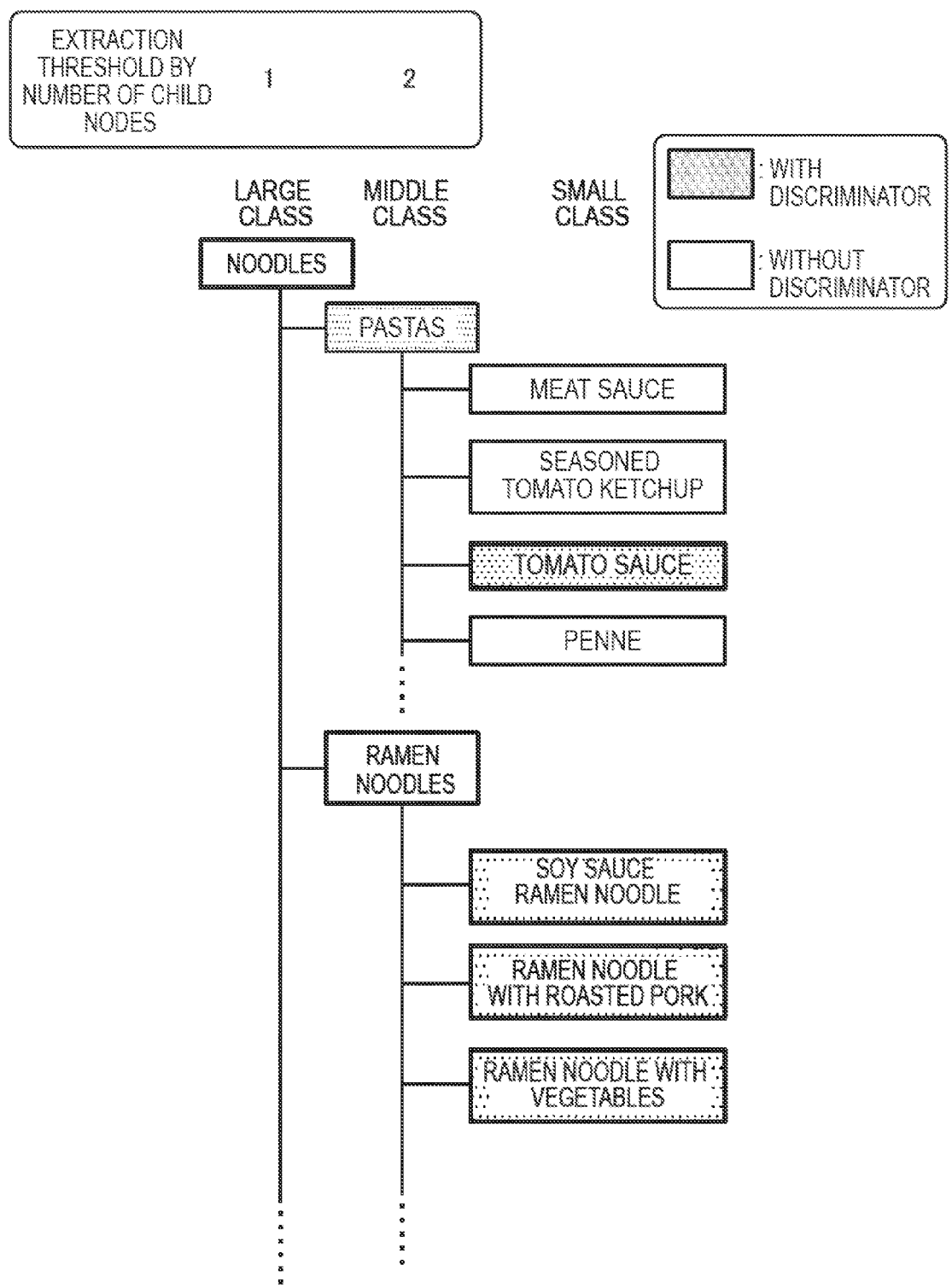

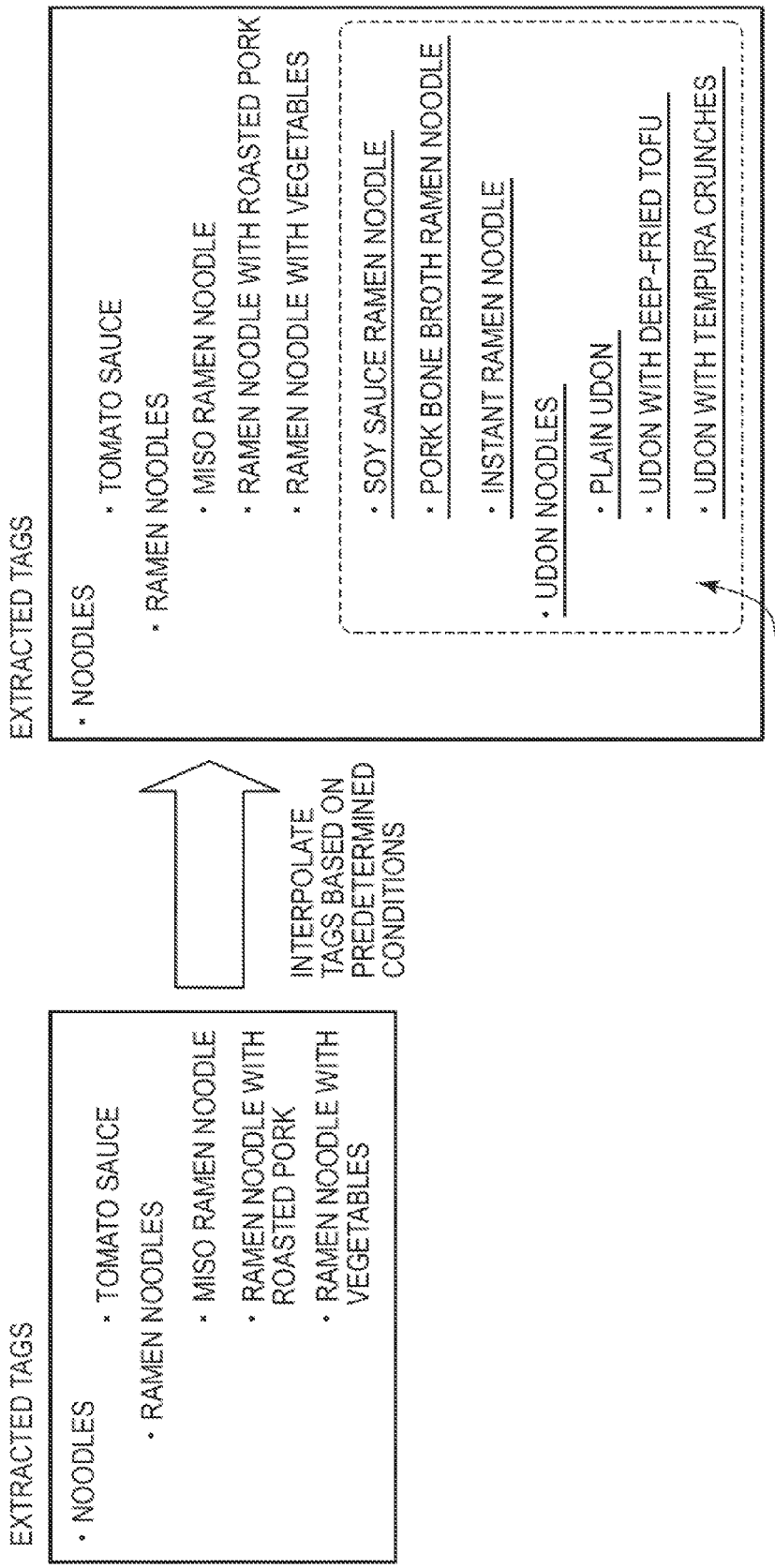

1

METHOD, SYSTEM AND PROGRAM FOR PROCESSING INPUT DATA TO FACILITATE SELECTION OF A CORRESPONDING TAG CANDIDATE

CROSS-REFERENCE TO RELATED APPLICATION

The present application claims priority from Japanese Patent Application No. JP 2011-222538 filed in the Japanese Patent Office on Oct. 7, 2011, the entire content of which is hereby incorporated by reference herein.

BACKGROUND

The present disclosure relates to an information processing device, an information processing server, an information processing method, an information extracting method, and a program.

There is a technique called clustering for creating a group of data which are positioned in a close distance within a feature space prescribed by a predetermined feature quantity, and the technique is widely applied to various fields. Also, there is a technique widely used to create a tree-like data structure by grouping data included in clusters generated by the clustering.

The data structure, which is thus created, has a configuration to have such structure that an upper hierarchical level includes a lower hierarchical level. Therefore, the data structure is used for searching for desired data by selecting from a group having coarser granularity to a group having finer granularity in order. Also, the data structure is used to create new groups of certain data each having different granularity by changing the hierarchical level (refer to, for example, Japanese Patent Application Laid-Open Publication No. 2007-122562).

When searching for a data group, many users trace in order from the top the hierarchy structure which is formed by clustering technique to obtain desired data. The Japanese Patent Application Laid-Open Publication No. 2007-122562 teaches a technique to provide a display screen which allows users to instinctively comprehend a hierarchy structure and provide easy data search.

SUMMARY

Here, a case where a user performs an operation to newly associate data with a group having been created by using the technique as in Japanese Patent Application Laid-Open Publication No. 2007-122562 (e.g. a case of newly associating an image contents with data structure of a tree structure related to image contents) will be considered. In such a case, the user determines the group to which the data to be newly processed corresponds, and repeats operations to scroll a display screen and click an input device such as a mouse until a hierarchical level in which the relevant group exists is displayed on the display screen. Due to this, in the case of newly associating data with a group included in the data structure of the tree structure that is already created, there has been a room for improvement in operability of applications.

Thus, in view of the above circumstances, in the present disclosure, an information processing device, information processing server, information processing method, information extracting method, and program therefor that are capable of further improving convenience of the user operation are proposed.

A information processing system according to an illustrative embodiment includes a processor for determining one or more candidate tags based on input data, the candidate tags being included within a hierarchical structure; and a display for displaying the candidate tags in a manner indicative of the candidate tags' positions in the hierarchical structure.

BRIEF DESCRIPTION OF THE DRAWINGS

FIG. 2 is an explanatory diagram schematically showing an overall configuration of information processing system according to an embodiment 1 of the present disclosure;

FIG. 5 is a block diagram showing an example of a configuration of an information processing server according to the embodiment 1;

FIG. 6 is an explanatory diagram showing an example of the tree structure according to the embodiment 1;

FIG. 7C is an explanatory diagram showing an example of the tag candidate extracting process according to the embodiment 1;

FIG. 8 is an explanatory diagram showing a tag candidate interpolating process according to the embodiment 1;

DETAILED DESCRIPTION OF THE EMBODIMENTS

Figure 1:
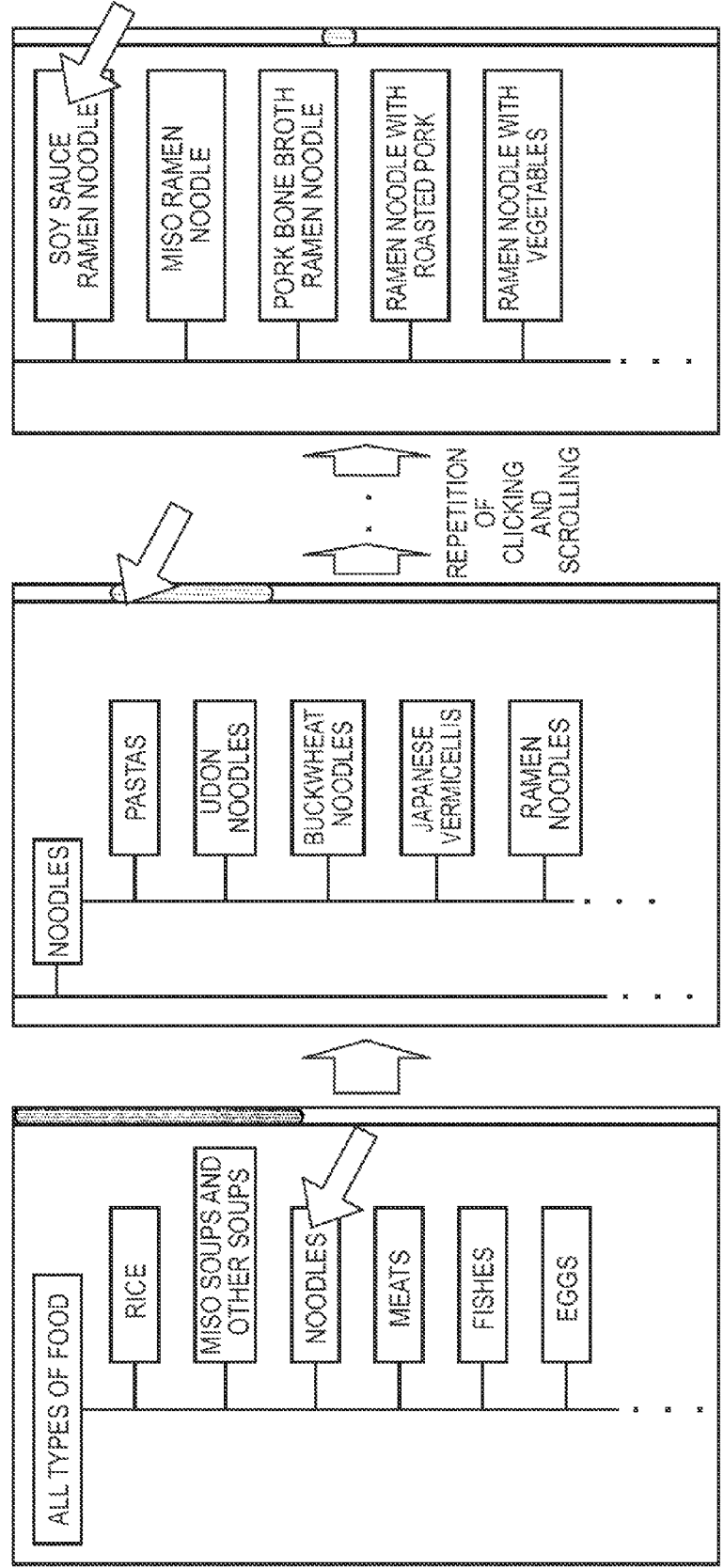
FIG. 1 is an explanatory diagram showing a tagging process with respect to data.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that, explanations will be given in the following order.

(1) As to tagging process
(2) As to concept of tree structure
(3) Embodiment 1
(3-1) As to information processing system
(3-2) As to configuration of information processing server
(3-3) As to configuration of information processing device
(3-4) As to another example related to input data
(3-5) As to information extracting method and information processing method
(3-6) Variant
(4) As to hardware configuration of information processing server and information processing device according to the embodiment of the present disclosure
(5) Conclusion (As to Tagging Process)

Prior to giving the explanation according to the embodiment of the present disclosure, a result of consideration given by the present inventor regarding a tagging process will briefly be explained with reference to FIG. 1, and the tagging process implemented by the embodiment of the present disclosure will briefly be explained with reference to FIG. 2.

In recent years, services that perform various types of health management based on inputs of meal logs by a user are increasing. In such services, detailed meal logs are required so as to perform the health management based on accurate data. However, in order to do so, the user is required to input food that the user him/herself ate from among a vast variety, namely hundreds and thousands, of food, and complication of this procedure is being a problem.

As one technique to resolve this complication, a method of providing food tag candidates based on a result of food identification on food images, or a history of past tagging results of the user may be considered.

However, even in a case where the food tags are indicated in a tree structure e.g. as shown in FIG. 1, the user selects a food tag (rices, noodles, and the like) from an upper hierarchical level toward a lower hierarchical level, and repeats processes while scrolling a display window or a display screen until reaching an aimed hierarchical level.

Such a repetition of operations fails convenience of the user, so a tagging method with satisfactory operability is desired. Thus, the present inventor eagerly investigated a method capable of improving the operability of applications and newly associating data easily with one of a plurality of tags indicated in a tree structure (in the example of FIG. 1, a method of newly associating a food with one of a plurality of food tags existing in the tree structure related to food tags).

As a result, as shown in FIG. 2, a method has been conceived in which, based on input data related to the food to be associated (e.g. image data in which the food to be associated is photographed), a tag relevant to the input data is identified, and a food tag that is highly likely to be selected by the user is narrowed down and presented based on an identification result of the tag.

Further, a method of presenting a tag candidate which the present inventor has conceived is applicable not only to the case of associating the image data, in which food is an object, with a tree structure in which food tags are structured, but also to cases in which voluntary input data is newly associated with a tree structure, such as associating a new and event or concept that is related to the tree structure indicating an inclusion relation of events and concepts.

Hereinbelow, the method of presenting a tag candidate that the present inventor has conceived will be explained in detail.

(As to Concept of Tree Structure)

Figure 3:
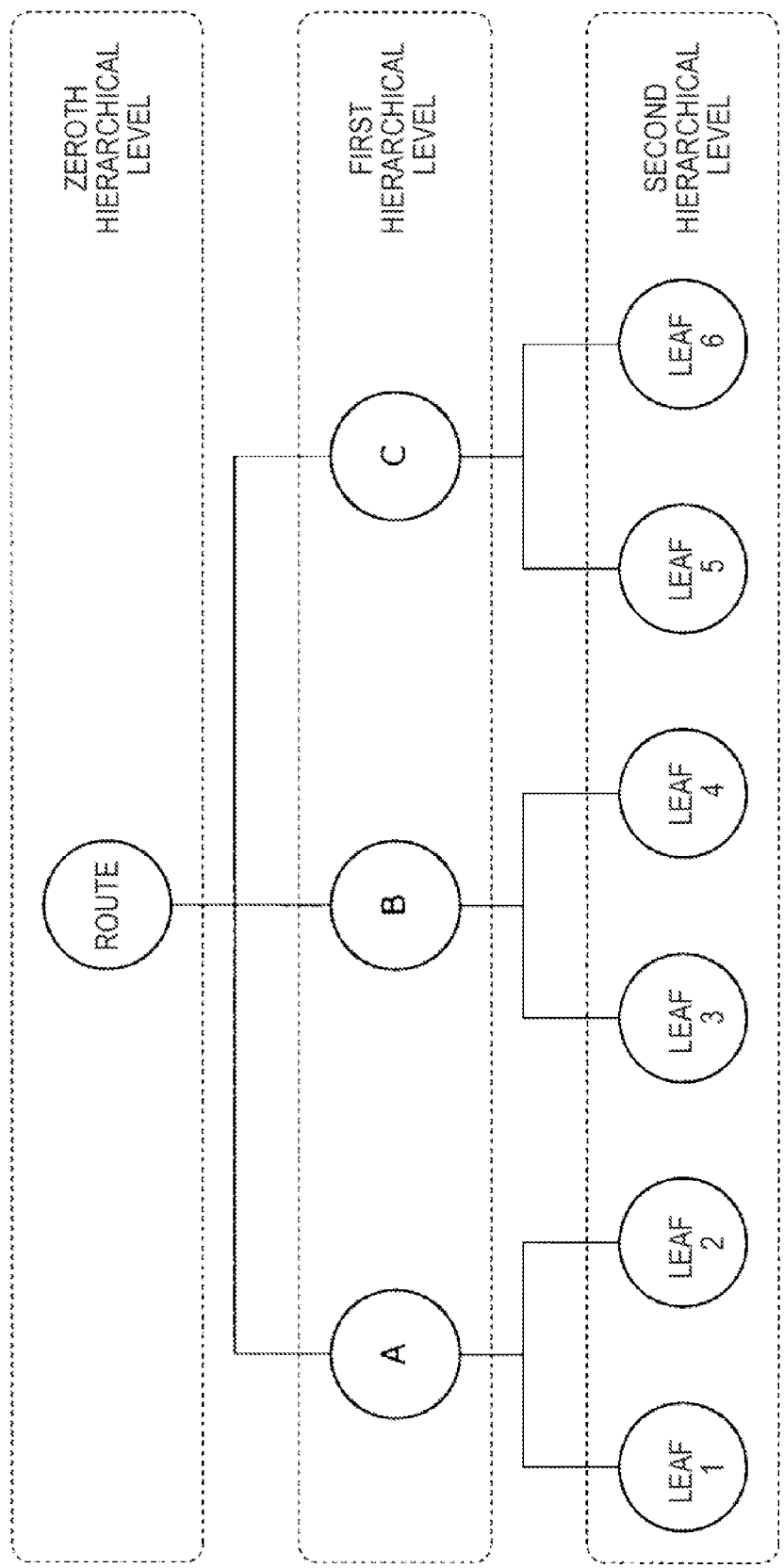
FIG. 3 is an explanatory diagram for explaining a tree structure.

Prior to giving explanations according to the embodiments of the present disclosure, terminology of the tree structure will briefly be explained with reference to FIG. 3. FIG. 3 is an explanatory diagram for explaining the tree structure.

The tree structure includes a plurality of elements (marked with a circle in FIG. 3) as shown in FIG. 3. Each of the plurality of elements is referred to as node. In the tree structure, a node positioned at the top is referred to as route node. As viewed from the route node, several branches extend downward from the route node in the figure, and at the end of each branch, a node is positioned respectively. By repeating branching as described above, the tree structure is formed to have a multilayered structure as shown in FIG. 3. In the tree structure, a node positioned at the bottom is referred to as a leaf node. As illustrated in the figure, no branch extends from the leaf nodes.

Here, when focusing to a node "B" shown in FIG. 3, a branch extending upward from the node B is connected to a route node; and branches extending downward from the node B are connected to two nodes (leaf nodes) of a leaf 3 and a leaf 4. Herein, a node, which is directly connected to a branch extending upward (i.e. toward the route node) like the route node with respect to the node B, will be referred to as parent node. Also, a node, which is directly connected to a branch extending downward (i.e. in a direction opposite to the direction toward route node) with respect to the node B like the leaf 3 and the leaf 4, will be referred to as child node.

Naming of "parent node" and "child node" is just a relative naming. When focused node is changed, the naming is also changed. For example, the node B is the parent node with respect to the leaf 3 or leaf 4, but the node B is a child node with respect to the route node.

The tree structure has a multilayered structure as shown in FIG. 3. Hereinafter, a hierarchical level to which the route node belongs will be referred to as 0-th hierarchical level; a hierarchical level to which a child node of the route node belongs will be called as first hierarchical level; and a hierarchical level to which a child node of the node which is positioned at the first hierarchical level will be referred to as second hierarchical level. Hereinafter, the hierarchies will be referred to as a third hierarchical level, a fourth hierarchical level . . . in order as necessary.

When focusing to the node B, child nodes other than the focused node, which are branched from the parent node of a certain node like the node A and node C, will be referred to as sibling node. For example, when focusing to the leaf 3 in FIG. 3, a sibling node thereof is the leaf 4.

FIG. 3 shows an example of a case where a plurality of branches extend from a certain node. However, the number of the branches extending downward (i.e. in a direction opposite to the direction toward route node) may be only one. Also, the number of the branches extending from a certain node is not limited to the example shown in FIG. 3.

By using the tree structure as shown in FIG. 3, the inclusion relation of the events and concepts associated with respective nodes and respective leaves can clearly be indicated.

Further, in the embodiments of the present disclosure explained below, not only the tree structure as shown in FIG. 3, but also, various types of structured information that indicate the inclusion relation of the events or concepts and that can be treated similar to the tree structure exemplified in FIG. 3 will be treated as information relevant to the tree structure indicating the inclusion relation of the events or concepts.

Embodiment 1

As to Information Processing System

Figure 4:
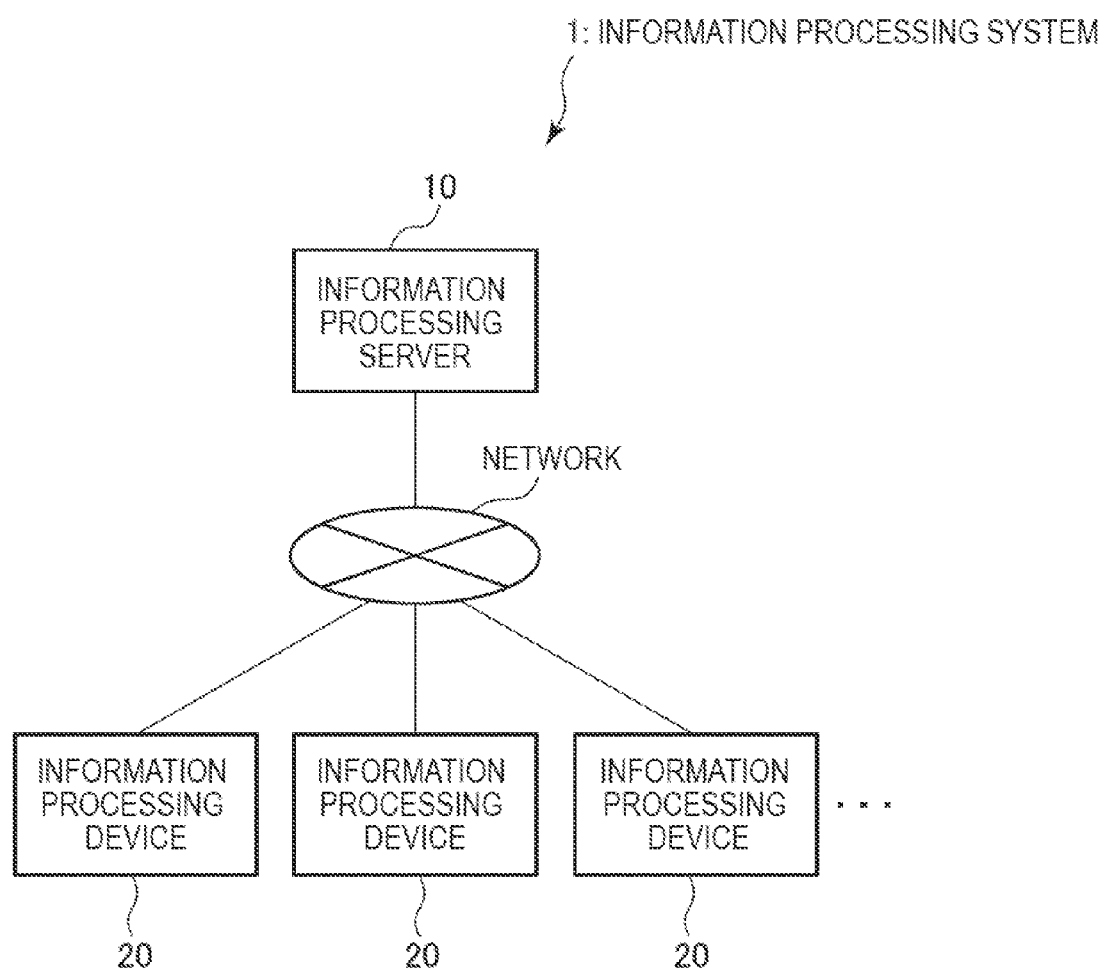
FIG. 4 is an explanatory diagram showing an example of the information processing system according to the embodiment 1.

Firstly, an information processing system according to the embodiment 1 of the present disclosure will briefly be explained with reference to FIG. 4. FIG. 4 is an explanatory diagram showing an information processing system 1 according to the present embodiment.

As shown in FIG. 4, the information processing system 1 according to the present embodiment includes an information processing server 10 and an information processing device 20. Further, the information processing server 10 and the information processing device 20 are configured capable of communicating with one another through a network.

The network is a communication line that connects the information processing server 10 and the information processing device 20 to one another in a manner capable of bidirectional communication. This network is configured for example of a public communication line network such as the Internet, telephone communication line, satellite communication network, broadcast communication path and the like, or a leased line network such as a WAN (Wide Area Network), LAN (Local Area Network), IP-VPN (Internet Protocol-Virtual Private Network), Ethernet (registered trademark), wireless LAN and the like, and it may be wired or wireless. That is, the information processing system 1 according to the present embodiment may be a part of a public service using the public communication line network such as the Internet and the like, or may be a private one using a home network utilizing the LAN and the like and that is not made public to third parties.

The information processing server 10 extracts, for each of granularities that is to be a reference of an inclusion relation of events or concepts, a tag that may correspond to input data from among a plurality of tags, based on the input data including at least one of a character, image or sound designated by the information processing device 20. The plurality of tags indicates distinctions for classifying the events or concepts that are respectively associated with the tree structure corresponding to the inclusion relation of the events or concepts. When the information processing server 10 extracts plural tags that are assumed to correspond to the designated input data, information regarding the extracted tags are outputted to a relevant information processing device 20. Further, when a tag corresponding to the input data is selected by the information processing device 20, the selected tag is associated with the input data based on information regarding a result of the tag selection. Due to this, the input data is associated with one of the tags in a target tree structure.

The information processing device 20 designates the input data including at least one of the character, image or sound and to which tagging is desired to the information processing server 10, and displays extracted tags on a display screen based on the information related to the tags extracted by the information processing server 10. Further, when a tag corresponding to the input data is selected by a user from the tags displayed on the display screen, the information related to the result of tag selection is outputted to the information processing server 10.

As an information processing device 20 as above, e.g. a personal computer, television, various recorders such as a DVD recorder and Blu-Ray recorder and the like, car navigation system, and information appliance can be exemplified. Further, the information processing device 20 may be one of various communication devices such as a cell phone, PDA, so-called smart phone and the like, portable contents player such as a portable music player and the like, portable game machine, and tablet type portable information terminal having a touch panel and the like.

The information processing server 10 and the information processing device 20 as above will again be explained in detail hereinbelow.

Note that, in FIG. 4, although there only is one information processing server 10 shown, a number of the information processing server 10 existing on the network is not limited to this example, and a plurality of information processing servers 10 may exist on the network. Further, in FIG. 4, although three information processing devices 20 are shown, the information processing device 20 existing on the network may be less than three, or may be at or more than four.

<As to Configuration of Information Processing Server>

Figure 7A:
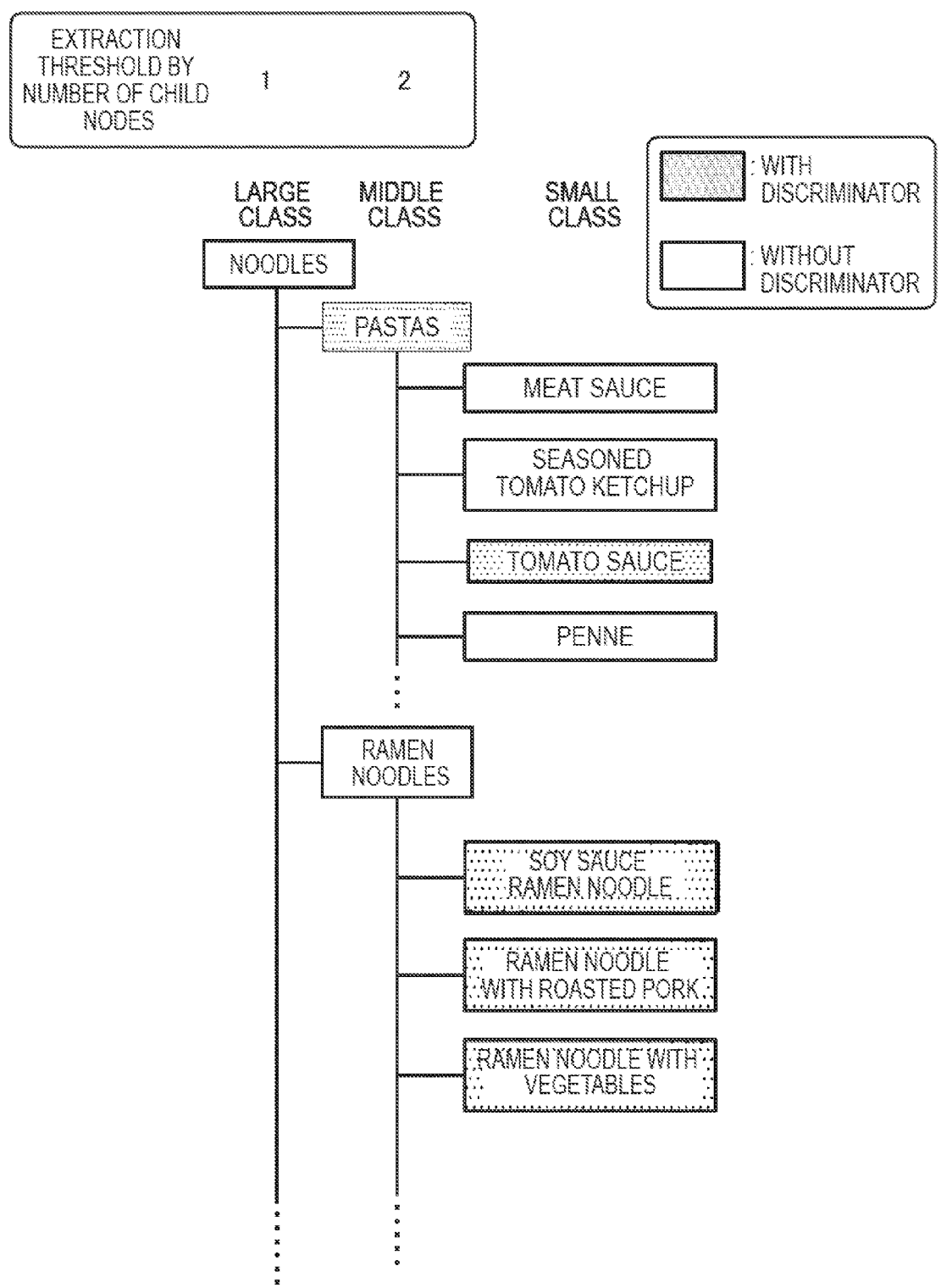
FIG. 7A is an explanatory diagram showing an example of a tag candidate extracting process according to the embodiment 1.
Figure 7B:
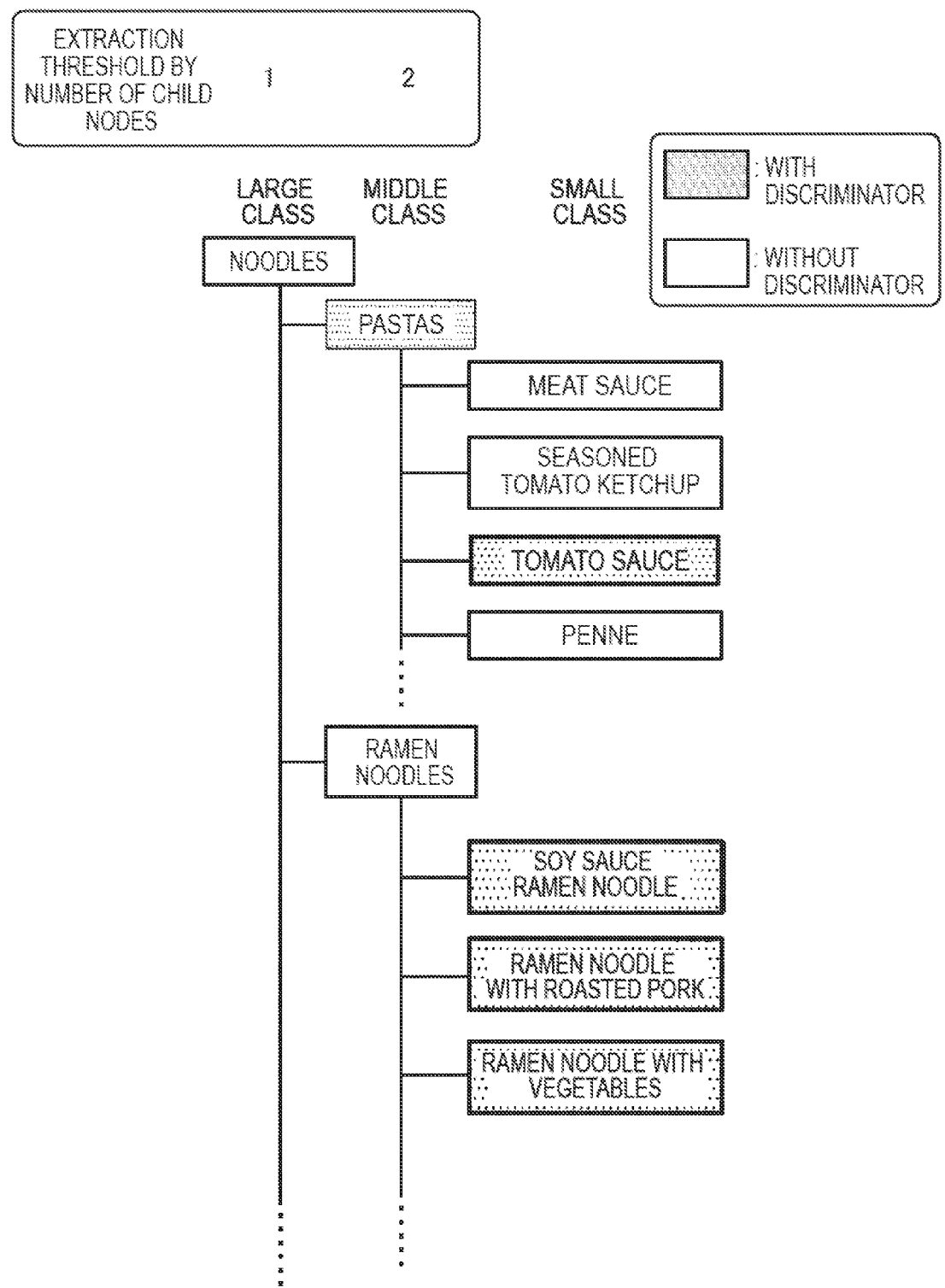
FIG. 7B is an explanatory diagram showing an example of the tag candidate extracting process according to the embodiment 1.

Next, a configuration of the information processing server 10 according to the present embodiment will be explained in detail with reference to FIG. 5 to FIG. 8. FIG. 5 is a block diagram showing an example of the configuration of the information processing server 10 according to the present embodiment. FIG. 6 is an explanatory diagram showing an example of the tree structure according to the present embodiment. FIG. 7A to FIG. 7C are explanatory diagrams showing examples of a tag candidate extracting process according to the present embodiment. FIG. 8 is an explanatory diagram showing a tag candidate interpolating process according to the present embodiment.

Note that, in the below explanation, image data created by photographing a food will be exemplified as an example of input data including at least one of a character, image or sound, and the explanation will be given of a case in which food tag candidates corresponding to the food that is photographed are extracted from a tree structure related to food tags based on the image data related to the aforementioned food.

As shown in FIG. 5, the information processing server 10 according to the present embodiment primarily includes a data acquiring section 101, process target area detecting section 103, tag identifying section 105, tag candidate extracting section 107, tag candidate information outputting section 109, user operation information acquiring section 111, tag allotting section 113, and storing section 115.

The data acquiring section 101 is implemented e.g. by a CPU (Central Processing Unit), ROM (Read Only Memory), RAM (Random Access Memory), input device, communicating device, and the like. The data acquiring section 101 acquires the input data including at least one of a character, image or sound as designated by the information processing device 20 from the information processing device 20, or from various information managing servers on the network with which the information processing server 10 can communicate. Further, in a case where the information processing server 10 itself has a function of the information managing server to retain and manage a variety of information, the data acquiring section 101 may acquire the input data designated by the information processing device 20 from a storing area such as the storing section 115.

When the designated input data is acquired from the various devices managing the aforementioned data, the data acquiring section 101 outputs the acquired input data to the process target area detecting section 103 to be described later.

The process target area detecting section 103 that is an example of an area detecting section is implemented e.g. by a CPU, ROM, RAM, and the like. The process target area detecting section 103 detects a data area, to be used in a tag identifying process by the tag identifying section 105 and a tag candidate extracting process by the tag candidate extracting section 107 as will be described later, from among the input data outputted from the data acquiring section 101.

In detecting a data area (process target area) that is to be a target of processing in the input data, the process target area detecting section 103 may determine a data area designated (manually) by a user operation as the process target area. Further, the process target area detecting section 103 may automatically detect the process target area from the input data by using a known processing technique such as a language recognition process, image detection/image recognition process, sound recognition process and the like.

In a case e.g. where the input data is the image data related to a food, the process target area detecting section 103 can automatically detect the process target area by a following method.

For example, by using a known technique to cut out a portion where a color component or texture characteristic of a food exists from an image, the process target area can be detected from the image data in which the food is photographed. Alternatively, the process target area can be detected from the image data in which the food is photographed by using a known technique to cut out a portion having a characteristic shape such as a shape of a plate or dish on which the food is served from the image.

By using the processes as above, the process target area detecting section 103 can e.g. detect the portion having a shape of a circle, oval, or rectangle that is characteristic of the plate or dish after having performed a contour detecting process on the image data that is the input data, and determine the detected area as the portion where the food exists (process target area).

When the process target area is detected from the input data as above, the process target area detecting section 103 creates information indicating a position of the process target area. Thereafter, the process target area detecting section 103 associates the created information indicating the position of the process target area with the input data, and outputs the same to the tag identifying section 105 to be described later. Further, the process target area detecting section 103 may store variety of information related to the detected process target area as a history in the storing section 115 to be described later.

Note that, a case in which a plurality of process target areas is detected in one piece of input data may occur. In such a case, the process target area detecting section 103 gives identification information (e.g. labeling numbers and the like) that differ from one another to the respective one of the detected process target areas, and thereby distinguishes the plurality of detected process target area. Thereafter, each of the information indicating the positions of the process target areas is outputted to the tag identifying section 105 to be described later.

The tag identifying section 105 is implemented e.g. by a CPU, ROM, RAM, and the like. The tag identifying section 105 identifies an input-data-corresponding tag that is a tag corresponding to the input data based on the input data. Here, a tag is a distinction for classifying events or concepts. In taking e.g. food as an example, names of respective food used in classifying the food (curry and rice, beef steak, sushi, and the like), or group names indicating types of food (meat cuisine, seafood cuisine, Japanese, Italian, and the like) correspond to tags.

More specifically, the tag identifying section 105 identifies a tag corresponding to the process target area in the input data based on various identifying processes by using the input data and the information indicating the position of the process target area outputted from the process target area detecting section 103.

In identifying the tag corresponding to the input data (hereinbelow referred to as input-data-corresponding tag), the tag identifying section 105 can use any known technique, however, the tag identifying section 105 may identify the input data-corresponding-tag by e.g. using methods as shown below.

(a) An identifying process using a discriminator related to the input data (b) An identifying process by searching similar data that is similar to the input data (c) An identifying process based on an association history of tags in the tree structure The identifying process using the discriminator related to the input data as indicated in the above (a) is a method to identify the tag of the input data by using the discriminator that is created by using a machine learning technique utilizing training data related to the input data. In using this identifying method, a plurality of data (training data) in which e.g. an image in which the food is photographed (food image) and a name of the food image (food tag) are associated with one another is used to predeterminedly create discriminators related to the respective food, and the created discriminators are stored in the storing section 115 and the like to be described later. Thereafter, the tag identifying section 105 identifies the food tag corresponding to the food image by inputting the food image to the respective discriminators.

In a case of using the identifying process by searching the similar data that is similar to the input data as indicated in the above (b), the tag identifying section 105 performs a similarity retrieval of data that the user or a large-scale user group (e.g. a user group in a network service such as an SNS) has tagged in the past by using the input data corresponding to the process target area. Then, the tag identifying section 105 handles the tag associated with the data determined as being similar to the input data as the tag corresponding to the input data. For example, in a case of performing the identifying process by the similar data search for the image in which a food is photographed (food image), the tag identifying section 105 performs a similarity determining process of the image data corresponding to the process target area and an image group that had been tagged by the user or the large-scale user group in the past. Then, if an image determined as being similar to the input image data exists, the tag identifying section 105 handles the food tag associated with the image determined as being similar as the food tag corresponding to the input image data.

Further, if there is a plurality of process target areas in image data, it is possible for the tag identifying section 105 to use the identifying process based on the association history of the tags in the tree structure as indicated in the above (c). This method is a method for identifying a tag of an unidentified process target area that is used in a case where a tag of another process target area existing in the same input data is already identified, based on a co-occurrence relationship of the tag associated with the already-identified process target area and the tagging that the user or the large-scale user group had done in the past. In this method, e.g. when a plurality of food is included in input image data and an identification result of the tag for food other than the food at focus is already obtained, food with a high chance of being selected is determined as an identification result from combinations of the tagging result of the food to which the identification result has already been obtained and the food tagged by the user or the large-scale user group in the past. Specifically, when the other food included in an image has already been tagged as "miso soup", and if the co-occurrence relationship that "the user or the large-scale users in many cases have a meal with a combination of "miso soup" and "rice"" exists, then the tag identifying section 105 identifies the food included in the unidentified process target area as "rice".

By using the methods as explained above, the tag identifying section 105 can identify tags independently for the process target areas in the input data.

Note that, the tag identifying section 105 may use one of the methods as in the above (a) to (c) independently, or may use them in combinations. Further, in using a plurality of methods in combinations, the tag identifying section 105 may integrally determine the identification results by the respective identifying methods, and may select a tag which appears more certain as the identification result.

Further, when a tag corresponding to the input data is identified, the tag identifying section 105 also outputs an evaluation value of the identification result of the tag (a score of the identification result, similarity score showing similarity, coincidence to the history, and the like). This evaluation value indicates how certain the identification result of the tag is (likelihood thereof), and it can be determined e.g. that as the value thereof is greater, the tag having that value has a higher chance of corresponding to the input data. A calculation method of the evaluation value of the identification result of the tag is not particularly limited, and any known technique may be used.

The tag identifying section 105 specifies a corresponding tag for each of the process target areas included in the input data according to the above, and when an evaluation value related to the specified tag is calculated, creates information (tag identification information) including a specification result of the tag (input-data-corresponding tag) and the evaluation value (tag identification information). Then, the tag identifying section 105 outputs the created tag identification information to the tag candidate extracting section 107 to be described later. Note that, the tag identifying section 105 may store the created tag identification information as history in the storing section 115 to be described later.

The tag candidate extracting section 107 is implemented e.g. by a CPU, ROM, RAM, and the like. The tag candidate extracting section 107 extracts, for each granularity that is to be the reference of the inclusion relation of the events or concepts, a tag that may correspond to the input data from among the plurality of tags respectively associated with the tree structure, based on the input data including at least one of a character, image or sound. Further, the tag candidate extracting section 107 may further extract a tag in a directly upper hierarchical level including a tag belonging to a same hierarchical level as extracted, in accordance with a circumstance of extraction of the tag belonging to the same hierarchical level in the tree structure.

As an example of the circumstance of the extraction of the tag belonging to the same hierarchical level in the tree structure, e.g. conditions as below may be exemplified. For example, in cases where one of the following conditions is satisfied, the tag candidate extracting section 107 may further extract a parent node of a relevant child node group as a tag candidate. Note that, the following conditions are merely an example, and conditions for determining whether to extract the tag in the directly upper hierarchical level or not are not limited to the following conditions.

Whether a tag candidate extracted from the child nodes exists in excess of a predetermined threshold or not
  Whether a tag candidate extracted from the child nodes exists in excess of a predetermined ratio or not
  Whether an average in identification scores of the child nodes is at or more than a predetermined threshold or not Here, as explained earlier, the tree structure that the tag candidate extracting section 107 will use in extracting the tag candidate indicates the inclusion relation of the events or concepts. As shown schematically e.g. in FIG. 3, the tree structure that the tag candidate extracting section 107 will use may indicate the events or concepts in the form of the tree structure, or may be a database or lookup table as shown in FIG. 6 with the food tags as the example in which the inclusion relation of matters such as the names of the food and classes.

In the example of the tree structure related to food tags shown in FIG. 6, the names of the food are described as small classes (in other words, leaf nodes in the tree structure as shown in FIG. 3), names of middle classes that are the classification distinction defining the food of the corresponding leaf nodes in broader terms as being the upper hierarchical level of the small classes, and names of large classes that are the classification distinction further defining the middle classes in broader terms are described.

In other words, the tree structure shown in FIG. 6 has the food tag "all types of food" as a root node, various nodes (food tags) relevant to the "large classes" as the nodes belonging to a first hierarchical level, various nodes relevant to the "middle classes" as the nodes belonging to a second hierarchical level, and various leaf nodes relevant to the "small classes" as the nodes belonging to a third hierarchical level. Further, in the tree structure shown in FIG. 6, nodes belonging to the same hierarchical level can be said as being a cluster having granularities similar to one another. The respective leaf nodes belonging to the third hierarchical level are the food tags used in final tagging of the input data.

Note that, a method of classifying the tree structure related to the food tags as shown in FIG. 6 is merely an example, and the granularities that are to be the references for the inclusion relation for distinguishing the middle classes and the large classes may be references as follows.

Depending on ingredients (grain, meat, fish, . . . , etc.)

Depending on cooking methods (baked, steamed, stewed, . . . , etc.)

Depending on regions (Japanese, Chinese, Italian, French, . . . , etc.)

Hereinbelow, the tag candidate extracting process by the tag candidate extracting section 107 will be specifically explained with reference to FIG. 7A to FIG. 7C with the tag candidate extracting process related to food tags as examples. Below, a portion of the tree structure related to the food tags in which the small class nodes in which discriminators exist and the small class nodes in which no discriminators exist are mixedly present as shown in FIG. 7A will be exemplified.

A case will be considered in which image data having photographed food belonging to noodles is notified as the input data to the tag candidate extracting section 107 that performs the extraction of tag candidates using a portion of the tree structure as shown in FIG. 7A. In this case, as shown in FIG. 7B, the tag candidate extracting section 107 firstly references the identification score included in the identification result outputted from the tag identifying section 105, and extracts the tag candidates according to the threshold determination of the identification score.

The tag candidate extracting section 107 references the identification score outputted from the tag identifying section 105, and determines whether the identification score is at or more than an extract threshold for each of the discriminators or not. In the example shown in FIG. 7B, the tag candidate extracting section 107 is assumed as having extracted four food tags of: "tomato sauce", "miso ramen noodle", "ramen noodle with roasted pork", and "ramen noodle with vegetables".

Next, as shown in FIG. 7C, the tag candidate extracting section 107 performs extraction of a tag candidate according to threshold determination of a number of selected child nodes. Here, as the extract threshold by the number of selected child nodes, a condition that whether an extracted number of directly lower small classes is 2 or more or not is set as the condition for extracting the hierarchical level relevant to the middle class, and a condition that whether an extracted number of directly lower middle classes is 1 or more or not is set as the condition for extracting the hierarchical level relevant to the large class.

As is apparent from the extraction result in step 1 shown in FIG. 7B, three child nodes (small classes) belonging to the middle class "ramen noodles" are extracted. This extracted number satisfies the condition for extracting the tag relevant to the middle class. Accordingly, as shown in FIG. 7C, the tag candidate extracting section 107 further extracts the middle class "ramen noodles" as a tag candidate based on the circumstance of extraction of the small class.

Further, with the middle class "ramen noodles" being extracted, the condition for extracting the tag relevant to the large class is satisfied. Accordingly, the tag candidate extracting section 107 further extracts the large class "noodles" as a tag candidate based on the circumstance of extraction of the middle class.

From the aforementioned processes, the tag candidate extracting section 107 extracts for the respective granularities the six types of food tags, namely: the large class "noodles", middle class "ramen noodles", and small classes "tomato sauce", "miso ramen noodle", "ramen noodle with roasted pork", and "ramen noodle with vegetables", as the tag candidates that may be relevant to the input data.

Further, since the tag candidates extracted by the tag candidate extracting section 107 according to the above processes are selected for each of the granularities, they construct a new tree structure configured of tags with high chances of being selected by the user instead of the overall tree structure that is prepared in advance.

Further, the tag candidate extracting section 107 may interpolate the extracted tags (tag candidates) by using tags related to the extracted tags and having high chances of being selected as the tag corresponding to the input data. There may be examples as follows of the tags having the high chances of being selected as the tag corresponding to the input data.

Tags popular to the user (in the example of the food tags, popular menu, standard menu and the like)

Tags among the child nodes with a large number of tagging in the past by the user or the large-scale user group Identification results based on tendencies of histories of the user or the large-scale user group By further extracting such tags, it becomes possible to extract tags by filtering even for a hierarchical level in which tags in the tree structure does not exist, and the user's convenience can further be improved.

For example, as shown in FIG. 8, a case will be considered in which "soy sauce ramen noodle", "pork bone broth ramen noodle", and "instant ramen noodle" exist as the small classes belonging to the middle class "ramen noodles", and "plain udon", "udon with deep-fried tofu", and "udon with tempura crunches" exist as the small classes belonging to a middle class "udon noodles" as the menu with a large number of past selections by the user or the large-scale user group. In this occasion, in addition to the tag candidates extracted in FIG. 7C, the tag candidate extracting section 107 also extracts tags as shown in FIG. 8 as the tag candidates.

After having extracted the tag candidates that may be relevant to the input data as aforementioned, the tag candidate extracting section 107 creates tag candidate information indicating the extraction results of the tag candidates, and outputs the same to the tag candidate information outputting section 109 to be described later. This tag candidate information may include not only the information indicating the extracted tag candidates, but also various metadata regarding the extracted tag candidates such as the evaluation values and the like of the extracted tag candidates. Further, the tag candidate extracting section 107 may associate the created tag candidate information with the input data corresponding to the tag candidate information, and store the same in the storing section 115 and the like as a history.

According to the above, the functions of the tag candidate extracting section 107 have been explained specifically with reference to FIG. 6 to FIG. 8.

Hereinbelow, by returning to FIG. 5, the tag candidate information outputting section 109 will be explained.

The tag candidate information outputting section 109 is implemented e.g. by a CPU, ROM, RAM, communicating device, and the like. The tag candidate information outputting section 109 outputs the tag candidate information that is information created by the tag candidate extracting section 107 and related to the extraction results of the tag candidates, to the information processing device 20 that had designated the input data corresponding to the tag candidate information. Due to this, the extraction results of the tag candidates by the tag candidate extracting section 107 are notified to the information processing device 20 that had designated the input data, and it becomes possible for the information processing device 20 to present information regarding the extracted tag candidates to the user.

The user operation information acquiring section 111 is implemented e.g. by a CPU, ROM, RAM, communicating device, and the like. The user operation information acquiring section 111 acquires user operation information indicating a result of tag selection outputted from the information processing device 20 with respect to the input data (which tag among the tag candidates has been selected as the tag corresponding to the input data by the user operation). When the user operation information indicating the result of tag selection by the user is acquired, the user operation information acquiring section 111 outputs the acquired user operation information to the tag allotting section 113 to be described later.

The tag allotting section 113 is implemented e.g. by a CPU, ROM, RAM, and the like. The tag allotting section 113 specifies the tag selected by the user from among the tag candidates extracted by the tag candidate extracting section 107 based on the user operation information indicating the result of tag selection by the user outputted from the user operation information acquiring section 111, and allots the tag selected by the user as the tag corresponding to the input data. Further, in a case where a tag other than the tag candidates extracted by the tag candidate extracting section 107 is selected by the user operation, the tag selected by the user is allotted as the tag corresponding to the input data. Due to this, the tag corresponding to the input data is specified.

The storing section 115 is implemented e.g. by a RAM, a storage device, and the like. The storing section 115 stores various discriminators used by the tag identifying section 105, various tree structures used by the tag candidate extracting section 107, and the like. Further, the storing section 115 may store various programs, various parameters that had to be stored upon performing some process, progresses of the process by the information processing server 10 according to the present embodiment, or various databases and the like, as appropriate. Further, in the storing section 115, the input data including at least one of a character, image or sound may be stored.

This storing section 115 can be freely accessed by respective processing sections such as the data acquiring section 101, process target area detecting section 103, tag identifying section 105, tag candidate extracting section 107, tag candidate information outputting section 109, user operation information acquiring section 111, tag allotting section 113, and the like, and data can be written and read thereby.

According to the above, an example of the functions of the information processing server 10 according to the present embodiment has been presented. The respective constituent features as above may be configured by multi-purposed members and circuits, or may be configured of hardware dedicated to the functions of the respective constituent features. Further, all of the functions of the respective constituent features may be performed by a CPU and the like. Accordingly, it is possible to modify the configuration to be used as appropriate depending on the technical levels at which the present embodiment is to be put into practice.

Note that, it is possible to create a computer program for implementing the respective functions of the information processing server according to the present embodiment as above, and install the same in a personal computer and the like. Further, a computer readable recording medium in which such a computer program is stored may be provided. The recording medium may e.g. be a magnetic disc, optical disc, magneto-optical disc, flash memory, and the like.

Further, the computer program may be delivered through e.g. a network without using the recording medium.

<Configuration of Information Processing Device>

Figure 9:
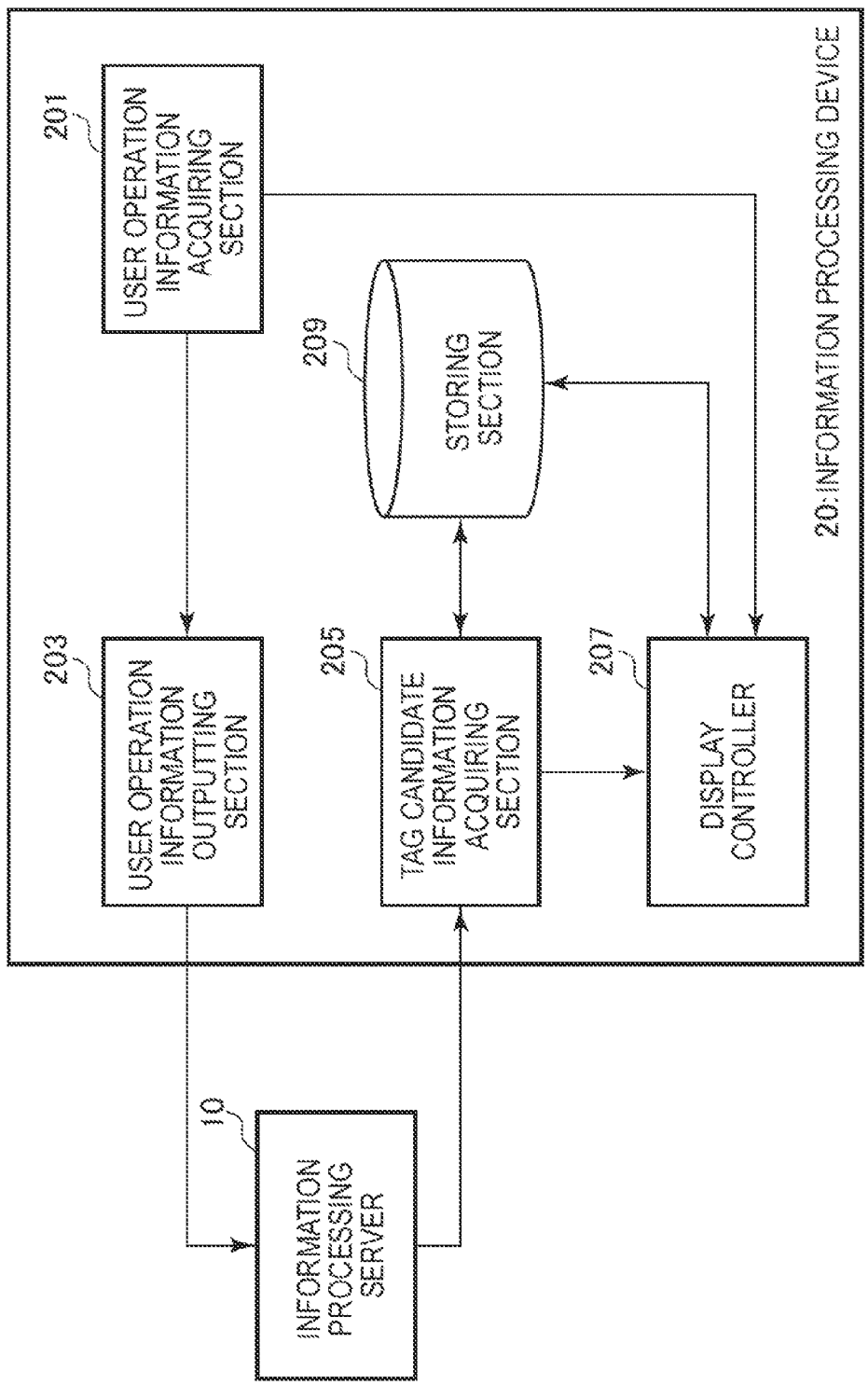
FIG. 9 is a block diagram showing an example of a configuration of an information processing device according to the embodiment 1.

Next, a configuration of the information processing device 20 according to the present embodiment will be explained in detail with reference to FIG. 9 to FIG. 15. FIG. 9 is a block diagram showing an example of the configuration of the information processing device 20 according to the present embodiment. FIG. 10 to FIG. 15 are explanatory diagrams showing examples of a display controlling process according to the present embodiment.

As shown in FIG. 9, the information processing device 20 according to the present embodiment primarily includes a user operation information acquiring section 201, user operation information outputting section 203, tag candidate information acquiring section 205, display controller 207, and storing section 209.

The user operation information acquiring section 201 is implemented e.g. by a CPU, ROM, RAM, input device, and the like. The user operation information acquiring section 201 specifies an operation (user operation) that the user had performed to an input device provided in the information processing device 20 such as a mouse, keyboard, touch panel, gesture input device, sight input device, and the like, and creates user operation information regarding the user operation. Thereafter, the user operation information acquiring section 201 outputs the created user operation information to the user operation information outputting section 203, tag candidate information acquiring section 205, display controller 207, and the like to be described later. Due to this, it becomes possible to grasp what kind of operation the user had performed on the information processing device 20, and it becomes possible to provide the function corresponding to the user operation to the user.

The user operation information outputting section 203 is implemented e.g. by a CPU, ROM, RAM, communicating device, and the like. The user operation information outputting section 203 outputs the user operation information to the information processing server 10. The user operation information is information to be used in various processes in the information processing server 10 among the user operation information outputted from the user operation information acquiring section 201, such as the user operation information related to designation of the input data, and the user operation information indicating the tag selected by the user from among the tag candidates. Note that, the user operation information that the user operation information outputting section 203 outputs to the information processing server 10 are not limited to the above examples.

The tag candidate information acquiring section 205 is implemented e.g. by a CPU, ROM, RAM, communicating device, and the like. The tag candidate information acquiring section 205 acquires tag candidate information describing the extraction results obtained by extracting tags that may correspond to the input data for each granularity (i.e. tag candidates) from among the plurality of tags outputted from the information processing server 10 and associated respectively with the tree structure. Upon acquiring the tag candidate information from the information processing server 10, the tag candidate information acquiring section 205 outputs the acquired tag candidate information to the display controller 207 to be described later. Further, the tag candidate information acquiring section 205 may associate the acquired tag candidate information with time information regarding the time at which the tag candidate information was acquired, and store the same in the storing section 209 and the like as a history.

The display controller 207 is implemented e.g. by a CPU, ROM, RAM, output device, communicating device, and the like. The display controller 207 acquires data stored in the storing section 209 and the like and corresponding to contents to be displayed on a display screen, and displays the same on the display screen. Further, if a signal indicating a movement of a position selecting object such as a pointer is transmitted from the input device provided in the information processing device 20 such as the mouse, keyboard, touch panel, gesture input device, sight input device, and the like, the display controller 207 displays the movement of the position selecting object on the display screen in accordance with the transmitted signal.

Further, in a case where a display of the tag candidates extracted from the information processing server 10 is requested by the tag candidate information acquiring section 205, the display controller 207 changes the displayed contents that are displayed on the display screen based on the request from the tag candidate information acquiring section 205. More specifically, when the tag candidate information describing the extraction results obtained by extracting tags that may correspond to the input data for each of the granularities from among the plurality of tags associated respectively with the tree structure is acquired from the tag candidate information acquiring section 205, the display controller 207 performs a control for displaying the tag candidates on the display screen for each granularity based on this tag candidate information.

Here, as for the display control performed by the display controller 207 based on the tag candidate information notified from the tag candidate information acquiring section 205 will be explained below with an indication of a specific example.

The storing section 209 is implemented e.g. by a RAM, storage device, and the like. In the storing section 209, object data to be displayed on the display screen are stored. The object data referred to herein include voluntary parts configuring a graphical user interface (GUI) such as icons, buttons, thumbnails and the like. Further, the storing section 209 may store various programs including applications to be executed by the information processing device 20 according to the present embodiment, various parameters that had to be stored upon performing some process, progresses of the process, or various databases and the like, as appropriate. Further, in the storing section 209, various data including at least one of a character, image or sound and that may be handled as the input data may be stored.

This storing section 209 can be freely accessed by respective processing sections such as the user operation information acquiring section 201, user operation information outputting section 203, tag candidate information acquiring section 205, display controller 207 and the like, and data can be written and read thereby.

[Example of Graphical User Interface]

Next, an example of the graphical user interface (GUI) provided to the user by the information processing device 20 will be explained specifically with reference to FIG. 10 to FIG. 15. Note that, in the example shown below, an example of the GUI that the information processing device 20 according to the present embodiment can provide to the user is exemplified; and the GUI that the information processing device 20 according to the present embodiment provides to the user is not limited to the following example.

Note that, in the following explanation, it is assumed that the tag candidates shown in FIG. 8 are extracted by the information processing server 10 based on the input data designated by the information processing device 20, and the tag candidate information regarding the extracted tag candidates is outputted from the information processing server 10.

In the case where the display screen control for providing the user with the tag candidates is requested from the tag candidate information acquiring section 205, the display controller 207 provided in the information processing device 20 according to the present embodiment creates a thumbnail display area in which the thumbnail of the input data is to be displayed and a tag candidate display area in which the contents of the tag candidate information are to be displayed on the display screen. Thereafter, the display controller 207 displays the thumbnail corresponding to the input data in the thumbnail display area, and displays the tag candidates for each of the granularities described in the tag candidate information in the tag candidate display area.

Note that, how the thumbnail display area and the tag candidate display area are arranged in the display screen is not particularly limited, and a voluntary layout may be employed.

Figure 10:
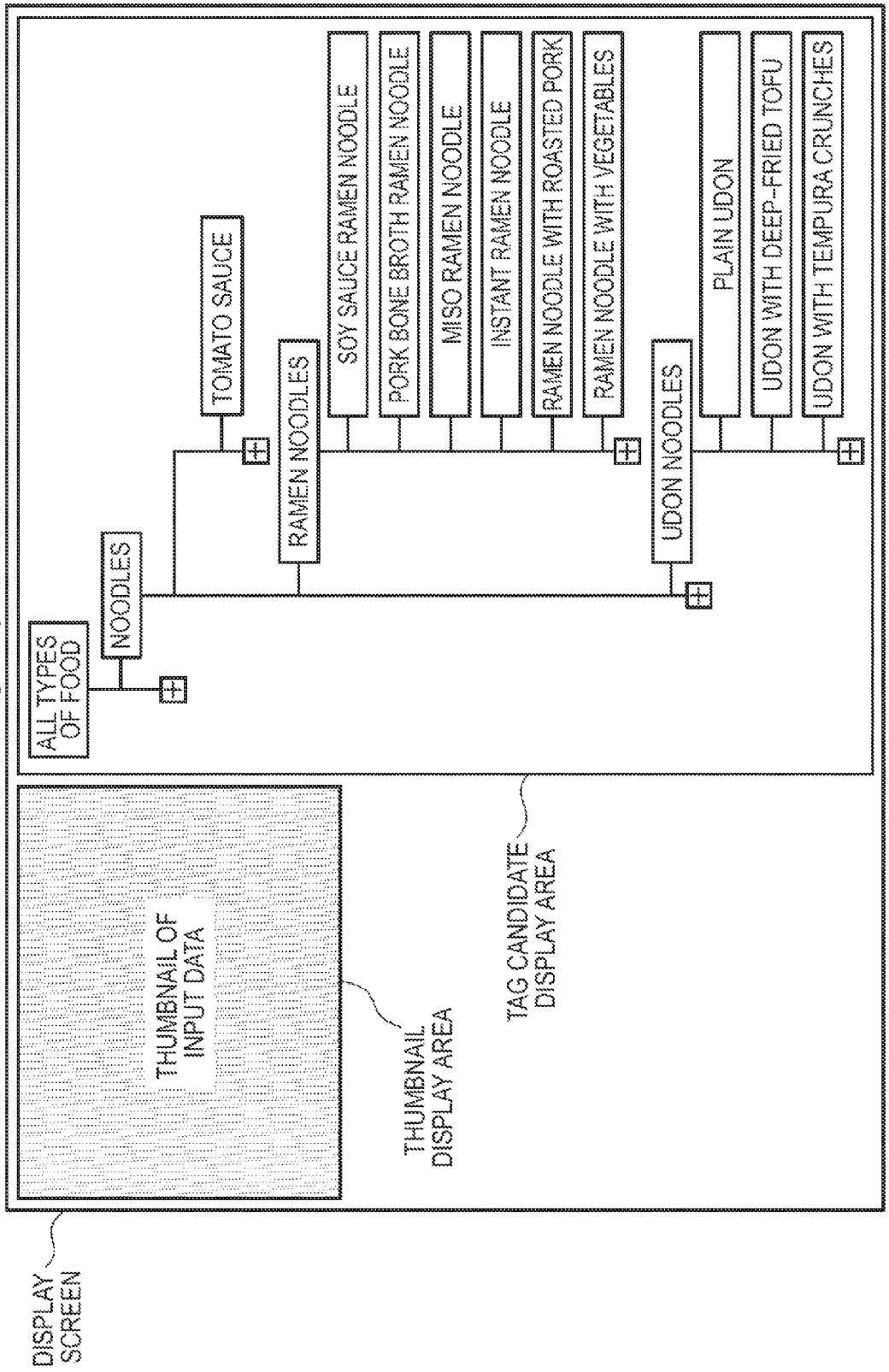
FIG. 10 is an explanatory diagram showing an example of a display controlling process according to the embodiment 1.

For example, in the GUI shown in FIG. 10, the display controller 207 displays the tag candidates described in the tag candidate information in the tag candidate display area in a form of the tree structure in accordance with the granularity. By indicating the tree structure as above, the user can grasp the tags that may be relevant to the input data for each of the granularities.

Figure 11:
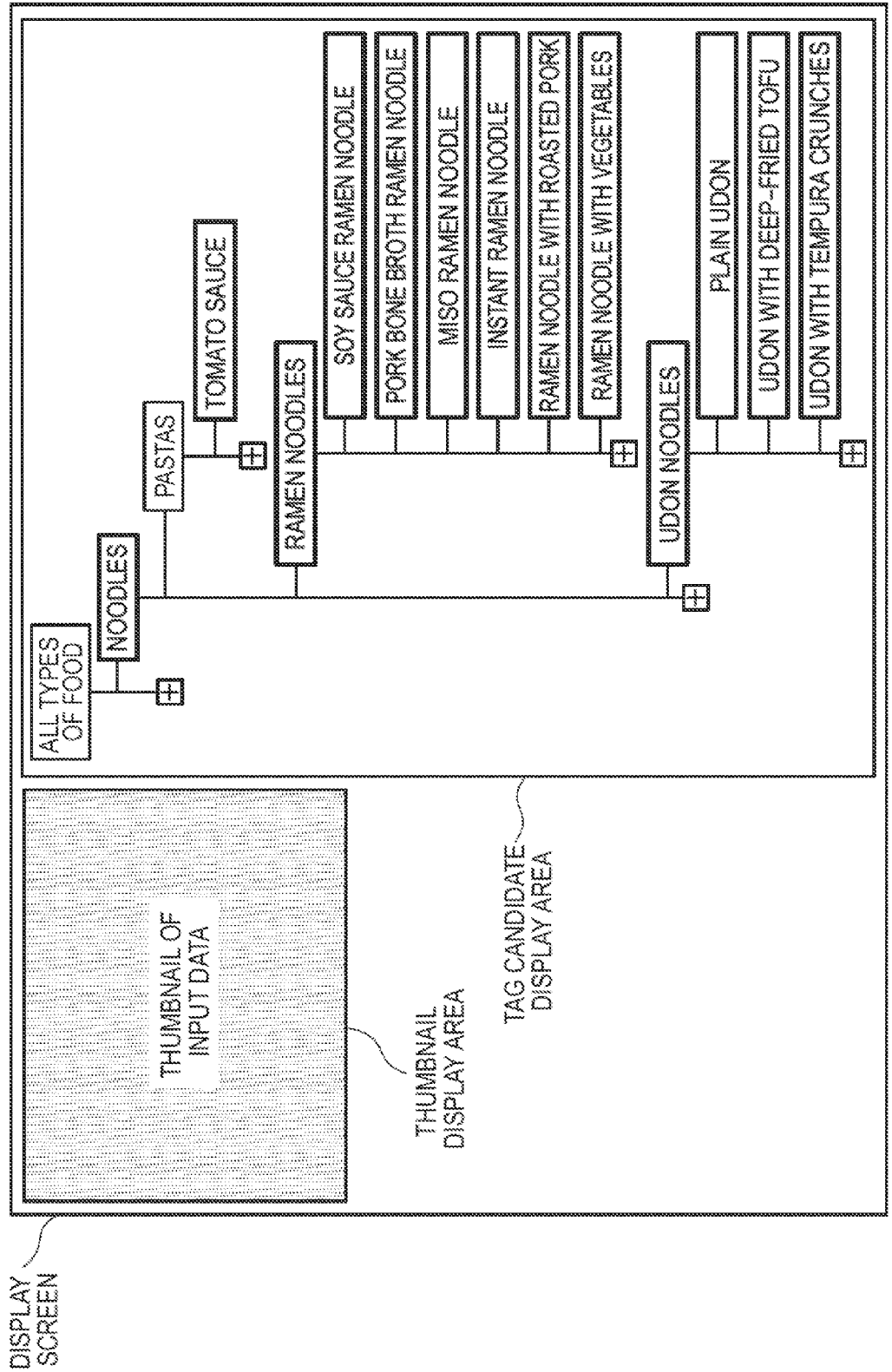
FIG. 11 is an explanatory diagram showing an example of the display controlling process according to the embodiment 1.

As in the tag e.g. of "pastas" in FIG. 11, the display controller 207 may auxiliary provide tags that were not extracted as the tag candidates to the user to improve the user's convenience. Further, the display controller 207 may change the display format of the tags based on the evaluation values included in the tag candidate information. That is, the display controller 207 may sort the tag candidates in an order of high evaluation values and display the same in the display screen; and as exemplified in FIG. 11, a display format of tag names (e.g. font type, color, size, thickness, etc.) may be changed in accordance with the evaluation values.

Figure 12:
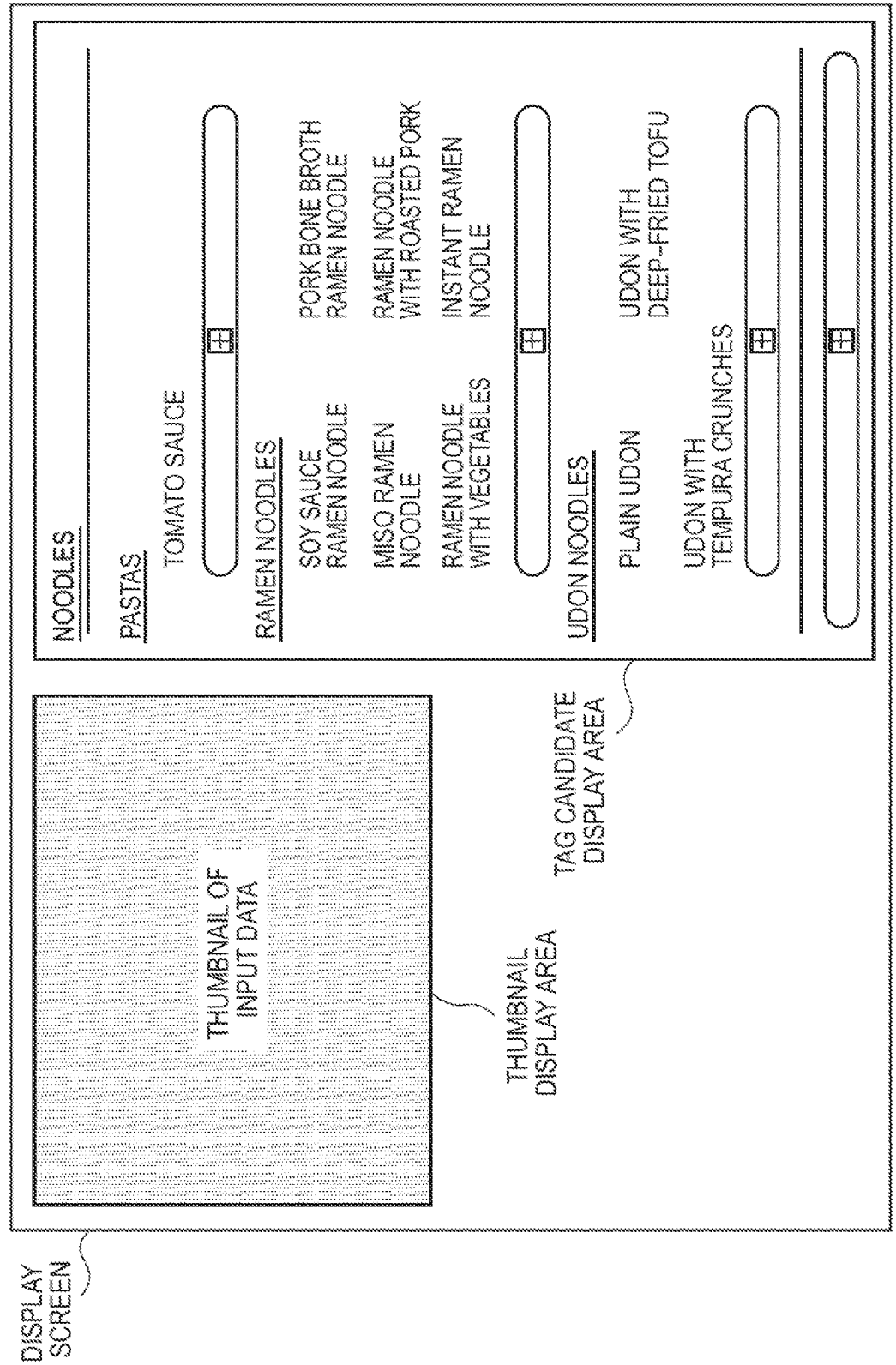
FIG. 12 is an explanatory diagram showing an example of the display controlling process according to the embodiment 1.

Further, as shown e.g. in FIG. 12, the display controller 207 may display a list or a table of the tag candidates described in the tag candidate information in accordance with the granularity. Further, the display controller 207 may display an object for displaying undisplayed tags also on the display screen, and may perform a display screen control to display the undisplayed tags in the tag candidate display area when this object is selected by the user.

Figure 13:
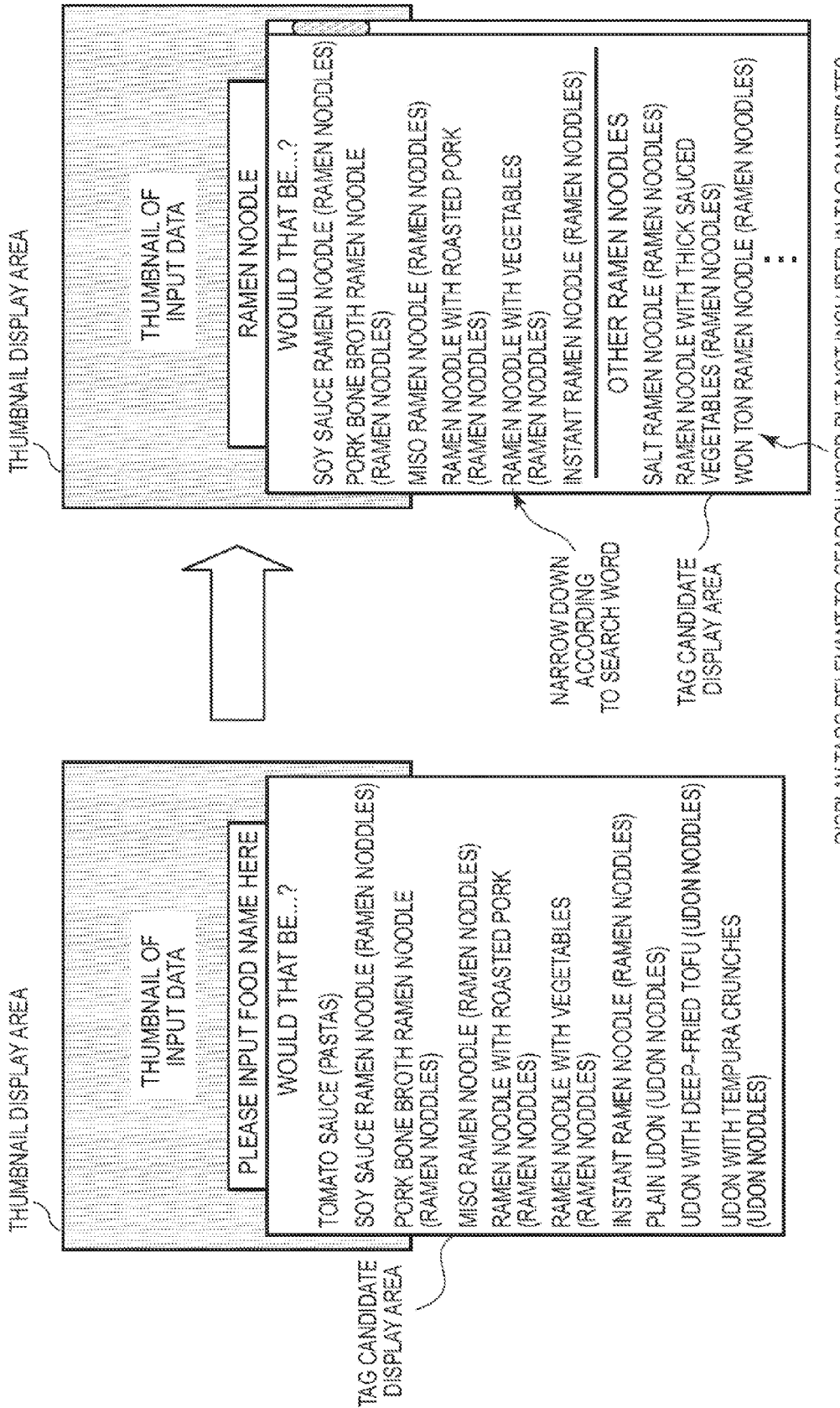
FIG. 13 is an explanatory diagram showing an example of the display controlling process according to the embodiment 1.
Figure 14:
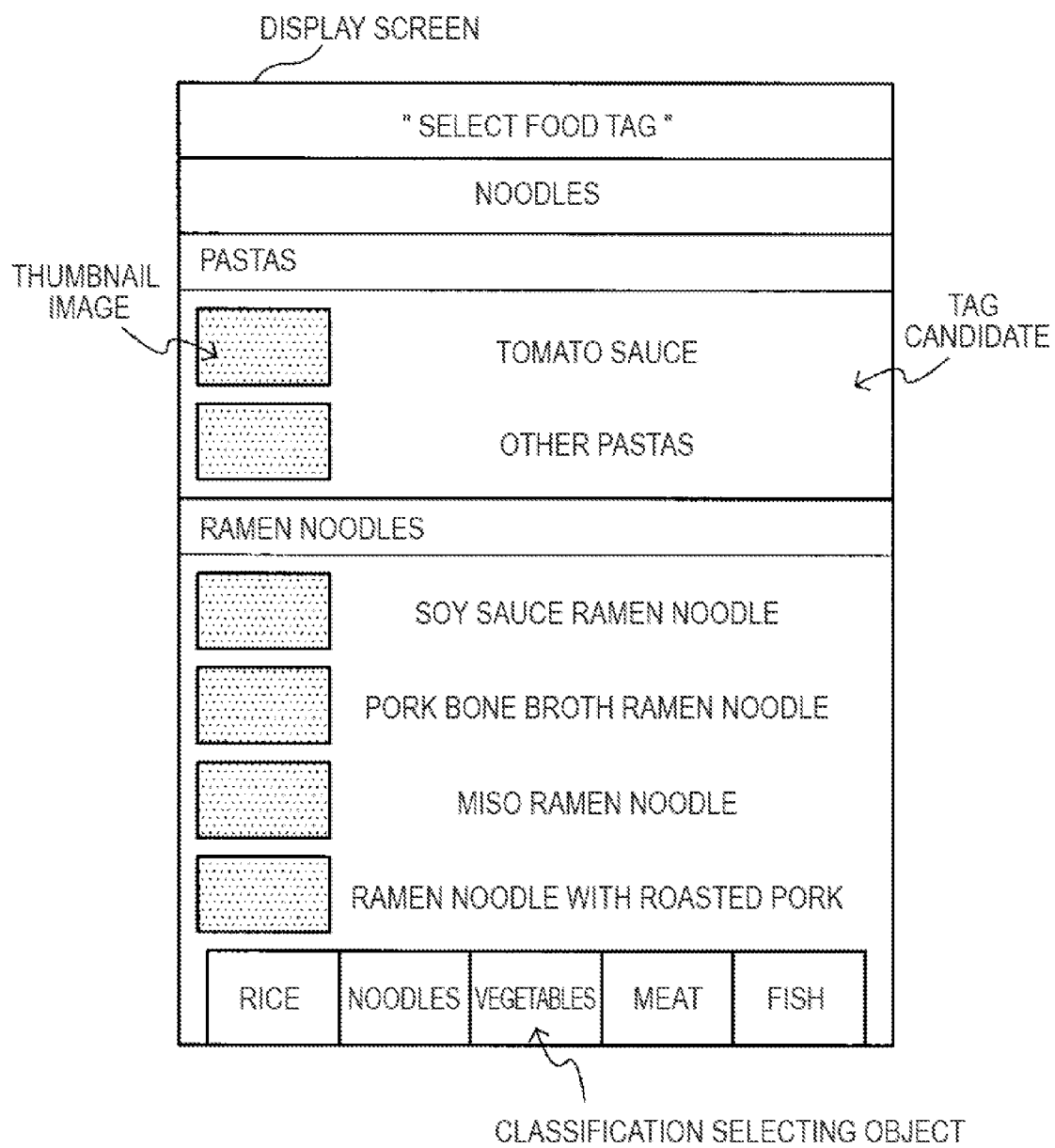
FIG. 14 is an explanatory diagram showing an example of the display controlling process according to the embodiment 1.

Further, as shown in FIG. 13, the display controller 207 can provide the user with a searching function for tag candidates by concurrently displaying a search word input area on the display screen. As shown in the left side of FIG. 13, in an initial state in which no search word is input, the display controller 207 displays the tag candidates described in the tag candidate information in the tag candidate display area. Thereafter, when a letter string is inputted by a user operation in the search word input area, as shown in the right side of FIG. 13, the tag candidates may be narrowed down based on the search word, and the result thereof may be displayed. Further, at this occasion, tags that are relevant to the search word but are not included in the tag candidate may concurrently be displayed in the tag candidate display area.

Further, the GUI provided by the display controller 207 is not limited to the examples shown in FIG. 10 to FIG. 13; for example, it may be modified appropriately in accordance with the size, etc. of the display screen. For example, in the GUI shown in FIG. 14, the tag candidates are shown in a list and the thumbnail images of the corresponding tag candidates are arranged in the vicinity of the names of the respective tag candidates, so as to make the respective display areas more compact. Further, in the GUI shown in FIG. 14, classification selecting objects (e.g. icons, etc.) for selecting the granularity are displayed on the display screen so as to improve the user operability.

Figure 15:
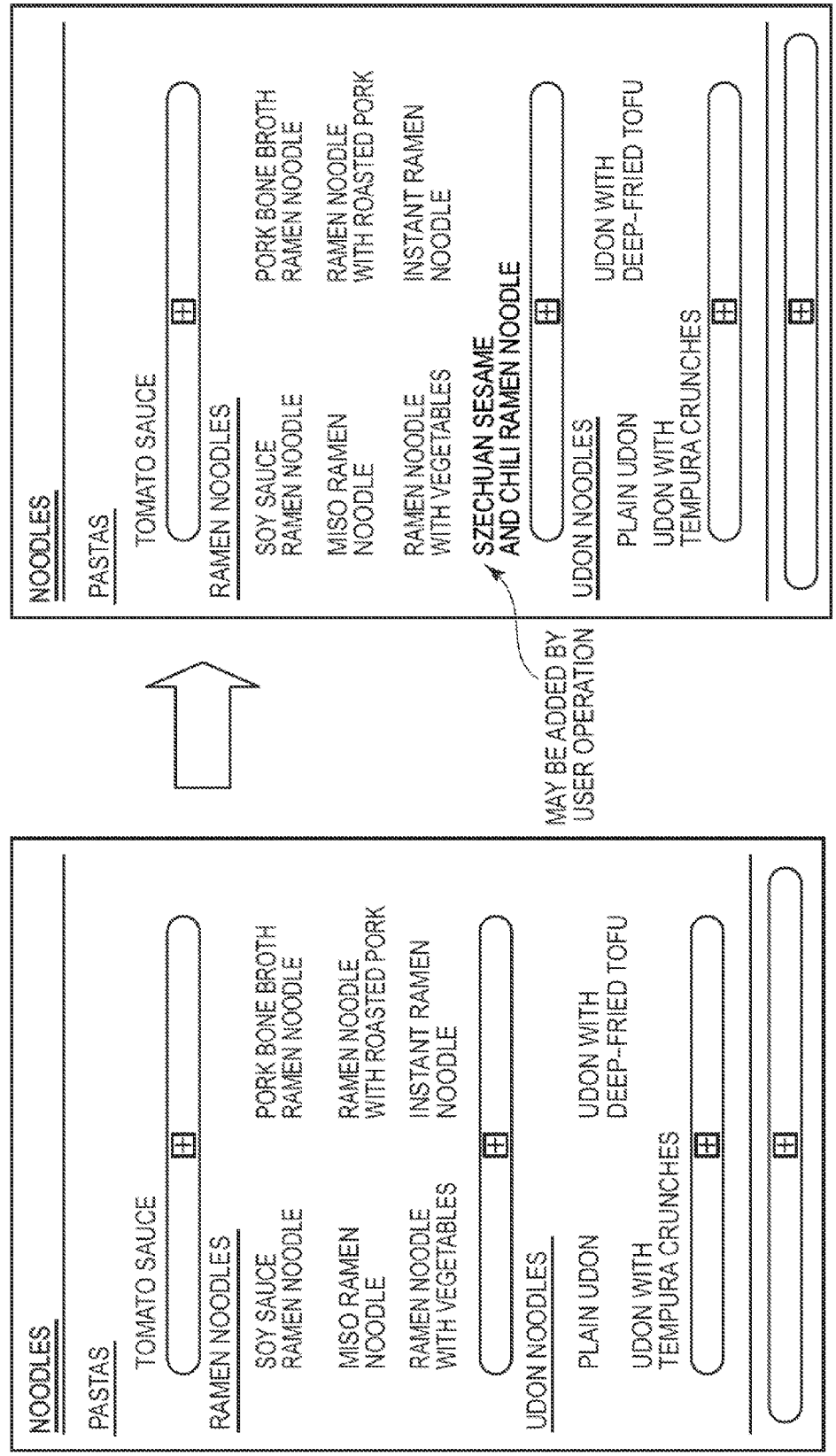
FIG. 15 is an explanatory diagram showing an example of the display controlling process according to the embodiment 1.

Note that, in the display controller 207, e.g. as shown in FIG. 15, a user interface for newly adding tags not described in the tag candidates in accordance with a user operation may be provided. Due to this, if a desired tag does not exist in the tag candidate display area, the user can newly create a tag and add the same. For example, in the example shown in FIG. 15, a small class "Szechuan sesame and chili ramen noodle" belonging to the middle class "ramen noodles" is added in accordance with the user operation.

Accordingly, the examples of the graphical user interface (GUI) presented to the user by the information processing device 20 have been explained specifically with reference to FIG. 10 to FIG. 15.

As described above, the examples of the functions of the information processing device 20 according to the present embodiment have been presented. The respective constituent features as above may be configured by multi-purposed members and circuits, or may be configured of hardware dedicated to the functions of the respective constituent features. Further, all of the functions of the respective constituent features may be performed by a CPU and the like. Accordingly, it is possible to modify the configuration to be used as appropriate depending on the technical levels at which the present embodiment is to be put into practice.

Note that, it is possible to create a computer program for implementing the respective functions of the information processing device according to the present embodiment as above, and install the same in a personal computer and the like. Further, a computer readable recording medium in which such a computer program is stored may be provided. The recording medium may e.g. be a magnetic disc, optical disc, magneto-optical disc, flash memory, and the like. Further, the computer program may be delivered through e.g. a network without using the recording medium.

<As to Another Example Regarding Input Data>

Note that, in the above explanation, the example of performing the tagging process of food with the image data in which food is photographed as the input data by the information processing server 10 and the information processing device 20 according to the present embodiment had been exemplified, however, the input data according to the present embodiment is not limited to the above example.

Figure 16:
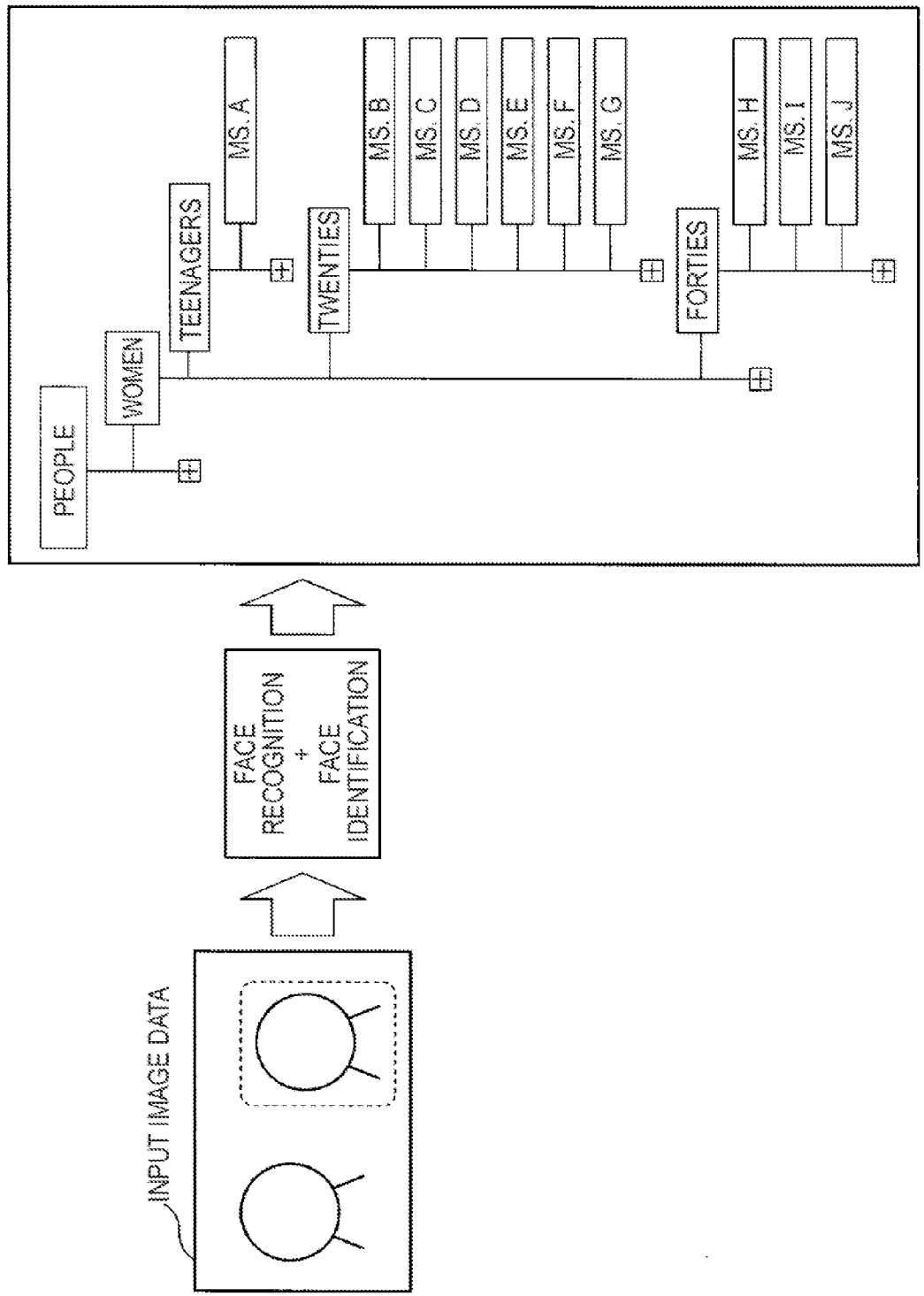
FIG. 16 is an explanatory diagram showing another example of the tag candidate extracting process and the display controlling process according to the embodiment 1.

Tag candidates may be extracted with respect to image data in which an object other than food (e.g. a person's face, etc.) exists. For example, in the example shown in FIG. 16, an example in which the information processing server 10 detects the face included in the input image data by a known face recognition technique, and performs a known face identifying process based on face identification attributes such as a person's sex, age, race, presence/absence of glasses and the like, and extracts tag candidates of person's names is exemplified.

Figure 17:
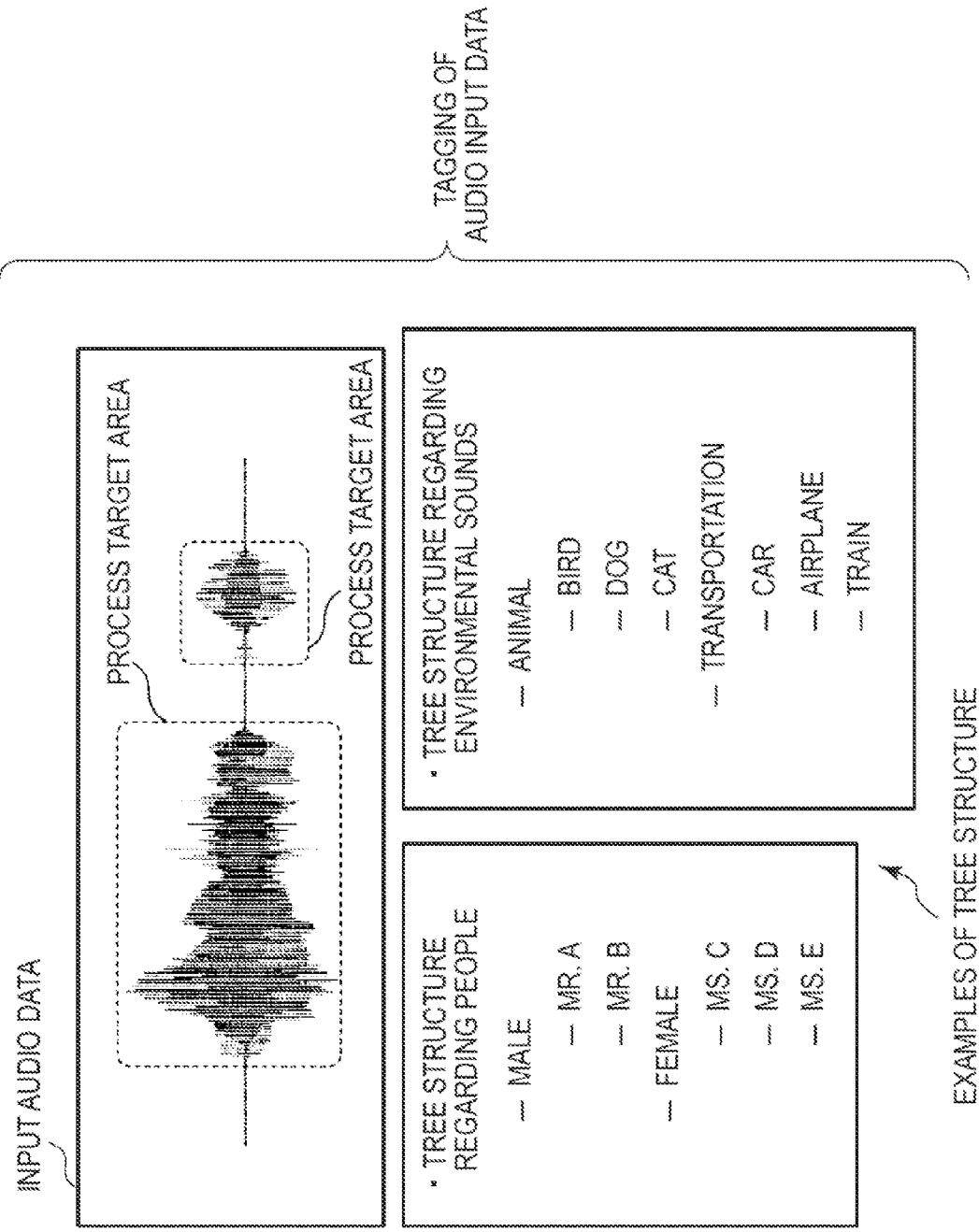
FIG. 17 is an explanatory diagram showing another example of the tag candidate extracting process and the display controlling according to the embodiment 1.

Further, the input data that the information processing server 10 and the information processing device 20 according to the present embodiment handle as the process target is not limited to data including an image, but such may be data including sound (audio data) e.g. as shown in FIG. 17. If audio data is designated as the input data, the information processing server 10 e.g. extracts a process target area from a speech waveform, and thereafter, the extraction of the tag candidates is performed based on known sound recognition technique and voiceprint recognition technique as well as a tree structure that is predeterminedly constructed. By performing such processes, as shown in FIG. 17, the information processing server 10 can extract the tag candidates regarding the person's names based on the audio data, and the tag candidates regarding environmental sounds.

Figure 18:
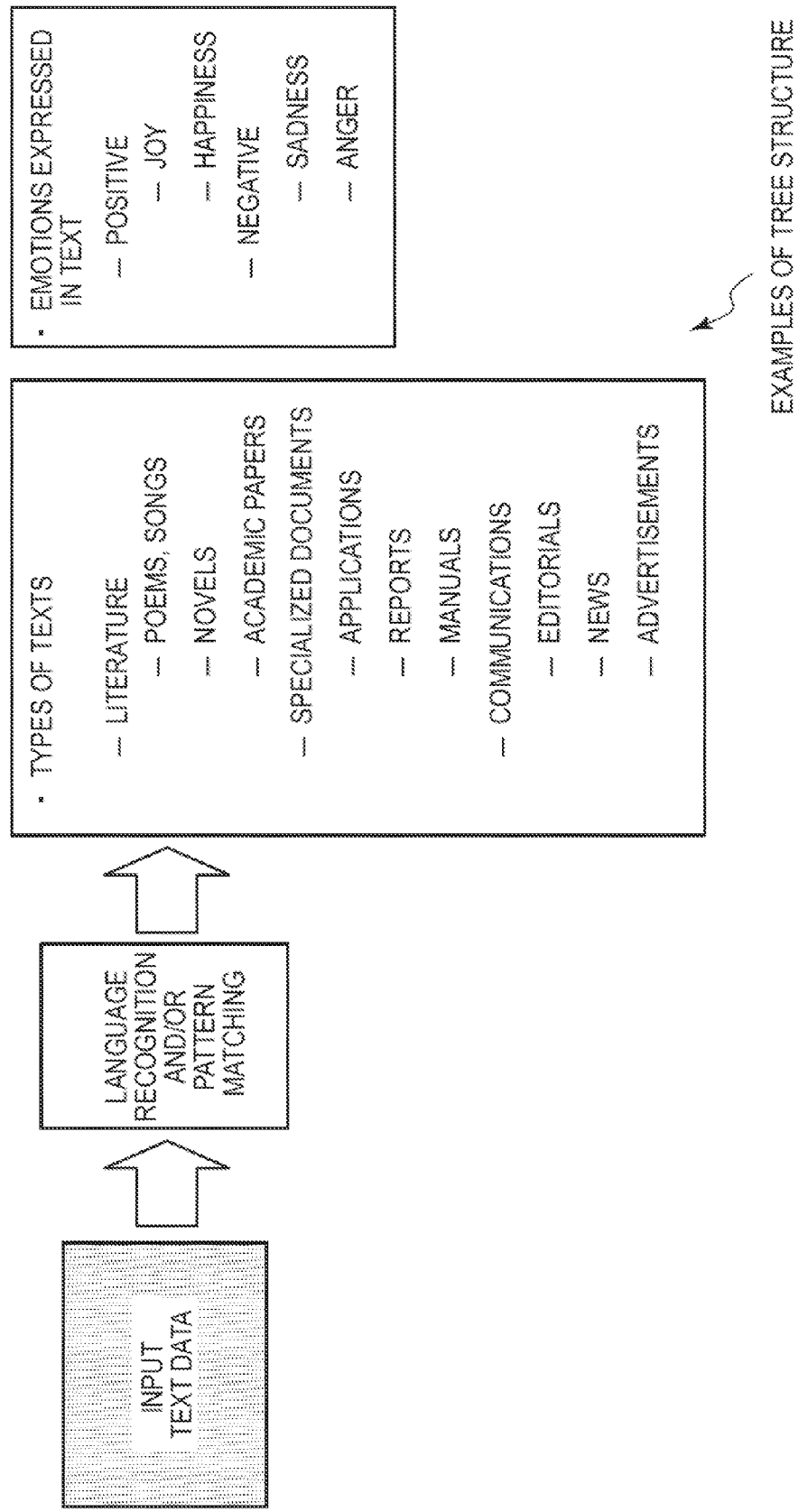
FIG. 18 is an explanatory diagram showing another example of the tag candidate extracting process and the display controlling according to the embodiment 1.

Further, the input data that the information processing server 10 and the information processing device 20 according to the present embodiment handle as the process target is not limited to data including an image, but may e.g. be text data as shown in FIG. 18. If text data is designated as the input data, the information processing server 10 e.g. extracts tag candidates regarding types of the text and tag candidates regarding emotions which the text expresses, as shown in FIG. 18, by using e.g. a known language recognition technique and pattern matching technique, as well as a tree structure that is predeterminedly constructed.

Further, the input data that the information processing server 10 and the information processing device 20 according to the present embodiment handle as the process target may be mixed data of an image, sound, and characters.

<As to Information Extracting Method and Information Processing Method>

Figure 19:
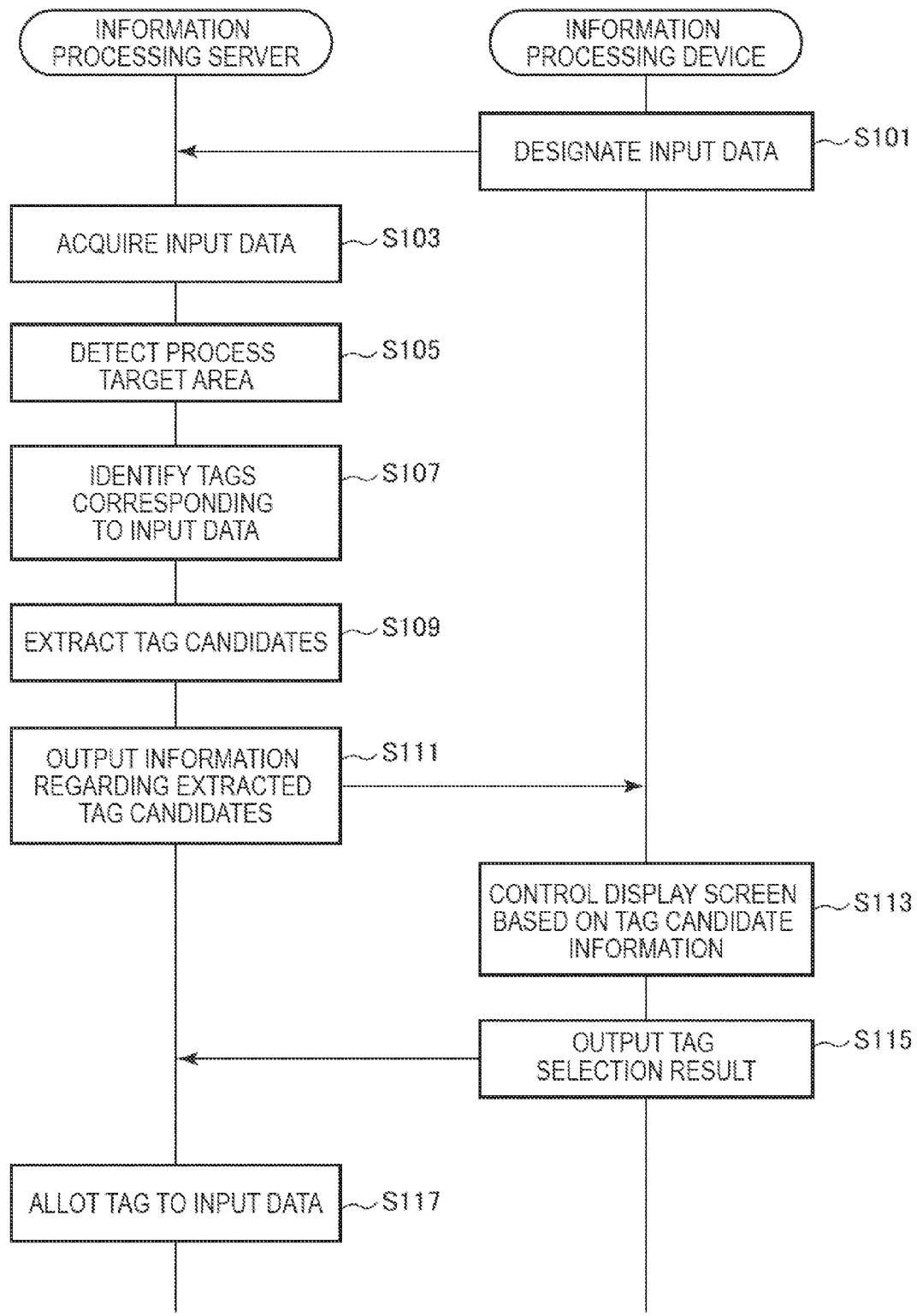
FIG. 19 is a flow chart showing an example of a flow of an information extracting method and an information processing method according to the embodiment 1.

Next, as to an information extracting method and information processing method performed by the information processing server 10 and the information processing device 20 according to the present embodiment, flows thereof will briefly be explained with reference to FIG. 19. FIG. 19 is a flow chart showing an example of the flows of the information extracting method and information processing method according to the present embodiment.

When the user operation information for designating the input data is acquired, the user operation information acquiring section 201 of the information processing device 20 according to the present embodiment outputs the acquired user operation information to the user operation information outputting section 203. Thereafter, the user operation information outputting section 203 outputs the user operation information that designates the input data to the information processing server 10. Due to this, the input data that the information processing server 10 handles as the process target is designated (step S101).

When the user operation information that designates the input data as outputted from the information processing device 20 is acquired, the information processing server 10 notifies information regarding location of the designated input data to the data acquiring section 101. The data acquiring section 101 acquires the relevant input data based on the location information of the input data as notified (step S103), and outputs the acquired input data to the process target area detecting section 103.

Thereafter, the process target area detecting section 103 detects the process target area from among the input data as outputted from the data acquiring section 101 by using a known technique (step S105), and outputs the information indicating the input data and the detection result to the tag identifying section 105.

The tag identifying section 105 identifies tags corresponding to the input data by using the data relevant to the process target data among the input data (step S107), and creates information regarding the identification results of the tags. Thereafter, the tag identifying section 105 outputs the created information regarding the identification results of the tags to the tag candidate extracting section 107.

The tag candidate extracting section 107 extracts the tag candidates by using the predeterminedly created tree structure and the information regarding the identification results of the tags outputted from the tag identifying section 105, according to the methods as explained earlier (step S109). Then, the tag candidate extracting section 107 creates the tag candidate information regarding the extracted tag candidates, and outputs the same to the tag candidate information outputting section 109.

The tag candidate information outputting section 109 outputs the tag candidate information as notified by the tag candidate extracting section 107 to the information processing device 20 (step S111). Due to this, information regarding the tag candidates that may be relevant to the input data designated by the information processing device 20 are provided to the information processing device 20.

When the tag candidate information outputted from the information processing server 10 is acquired, the tag candidate information acquiring section 205 of the information processing device 20 outputs the acquired tag candidate information to the display controller 207. The display controller 207 performs the display screen control for providing the user with the tag candidates extracted by the information processing server 10 based on the tag candidate information outputted from the tag candidate information acquiring section 205 (step S113).

When the tag candidate corresponding to the input data is selected by the user operation, the user operation information acquiring section 201 creates the user operation information indicating the selection result by the user and outputs the same to the user operation information outputting section 203. The user operation information outputting section 203 outputs the user operation information indicating the selection result by the user regarding the tag to the information processing server 10 (step S115).

When the user operation information indicating the selection result by the user regarding the tag as outputted from the information processing device 20 is acquired, the user operation information acquiring section 111 of the information processing server 10 outputs the acquired user operation information to the tag allotting section 113. The tag allotting section 113 allots the tag selected by the user as the tag corresponding to the input data based on the user operation information outputted from the user operation information acquiring section 111 (step S117). Due to this, the tag corresponding to the input data is finalized, and location relationships in the tree structure is finalized.

As described above, the flows of the information extracting method and the information processing method performed by the information processing server 10 and the information processing device 20 according to the present embodiment have been briefly explained with reference to FIG. 19.

<Variant>

The functions of the information processing server shown in FIG. 5 and the functions of the information processing device 20 shown in FIG. 9 may be implemented in either hardware so long as the both hardware can send and receive information to and from one another through a network. Further, a process to be performed by a particular processing section may be implemented by one hardware, or may be implemented by a distributed processing by a plurality of hardware.

Figure 20:
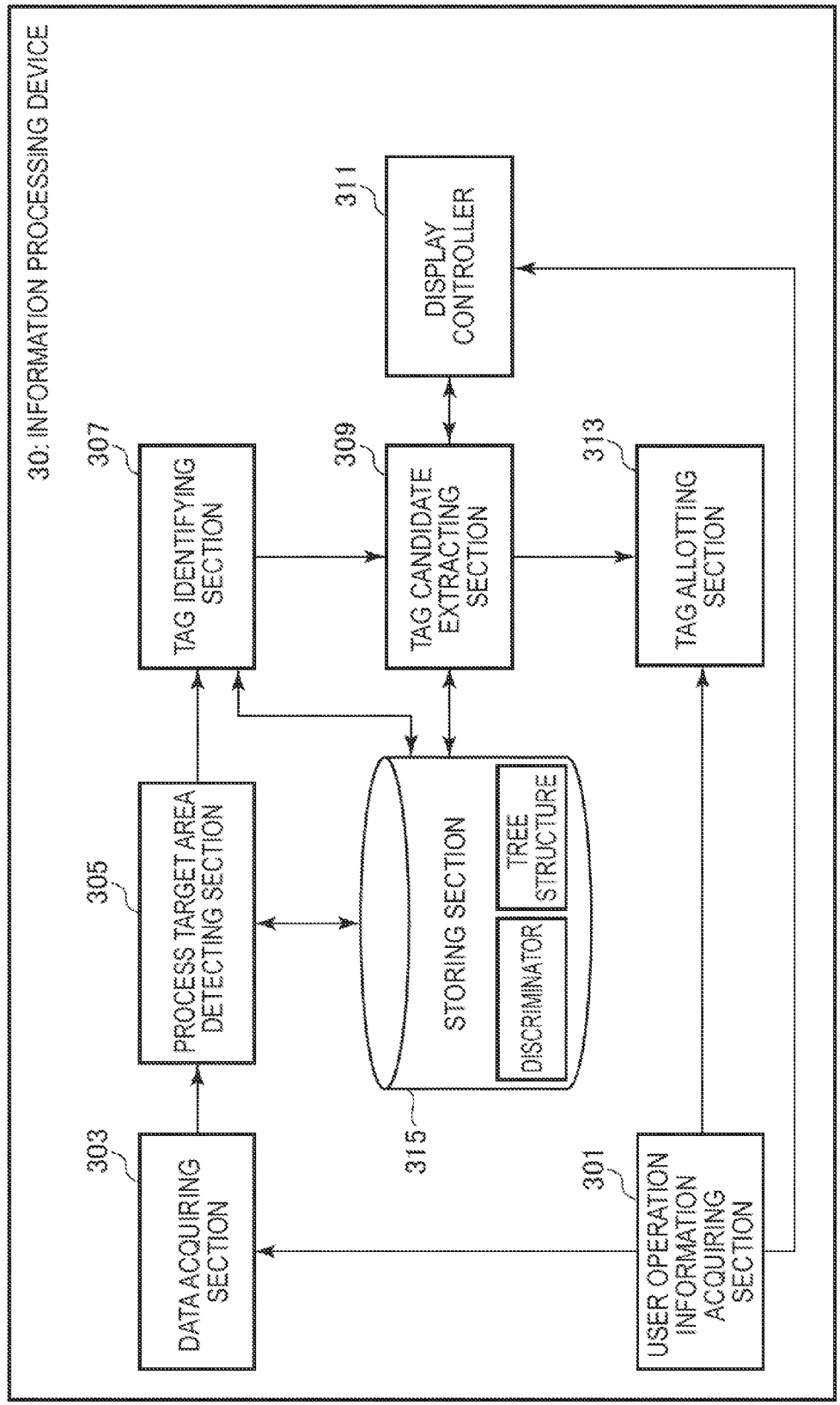
FIG. 20 is a block diagram showing a variant of the information processing system according to the embodiment 1.

In the variant shown e.g. in FIG. 20, an example in which the functions of the information processing server 10 shown in FIG. 5 and the functions of the information processing device 20 shown in FIG. 9 are implemented in one device is shown.

The information processing device 30 shown in FIG. 20 according to the variant primarily includes a user operation information acquiring section 301, data acquiring section 303, process target area detecting section 305, tag identifying section 307, tag candidate extracting section 309, display controller 311, data allotting section 313, and storing section 315.

Here, the user operation information acquiring section 301 has similar functions as the user operation information acquiring section 201 shown in FIG. 9 except for that it outputs the acquired user operation information to the data acquiring section 303, display controller 311, and tag allotting section 313, and similar effects can be achieved. Further, the display controller 311 has similar functions as the display controller 207 shown in FIG. 9 except for that it performs the display control based on the tag candidate information outputted from the tag candidate extracting section 309, and similar effects can be achieved. Accordingly, hereinbelow detailed explanations regarding these processing sections will be omitted.

Further, the data acquiring section 303, process target area detecting section 305, tag identifying section 307, tag candidate extracting section 309, tag allotting section 313, and storing section 315 have similar functions as the data acquiring section 101, process target area detecting section 103, tag identifying section 105, tag candidate extracting section 107, tag allotting section 11, and storing section 115 respectively shown in FIG. 5, and similar effects can be achieved. Accordingly, hereinbelow detailed explanations regarding these processing sections will be omitted.

As described above, the variant of the information processing server 10 and information processing device 20 according to the embodiment 1 was briefly be explained with reference to FIG. 20.

(Hardware Configuration)

Figure 21:
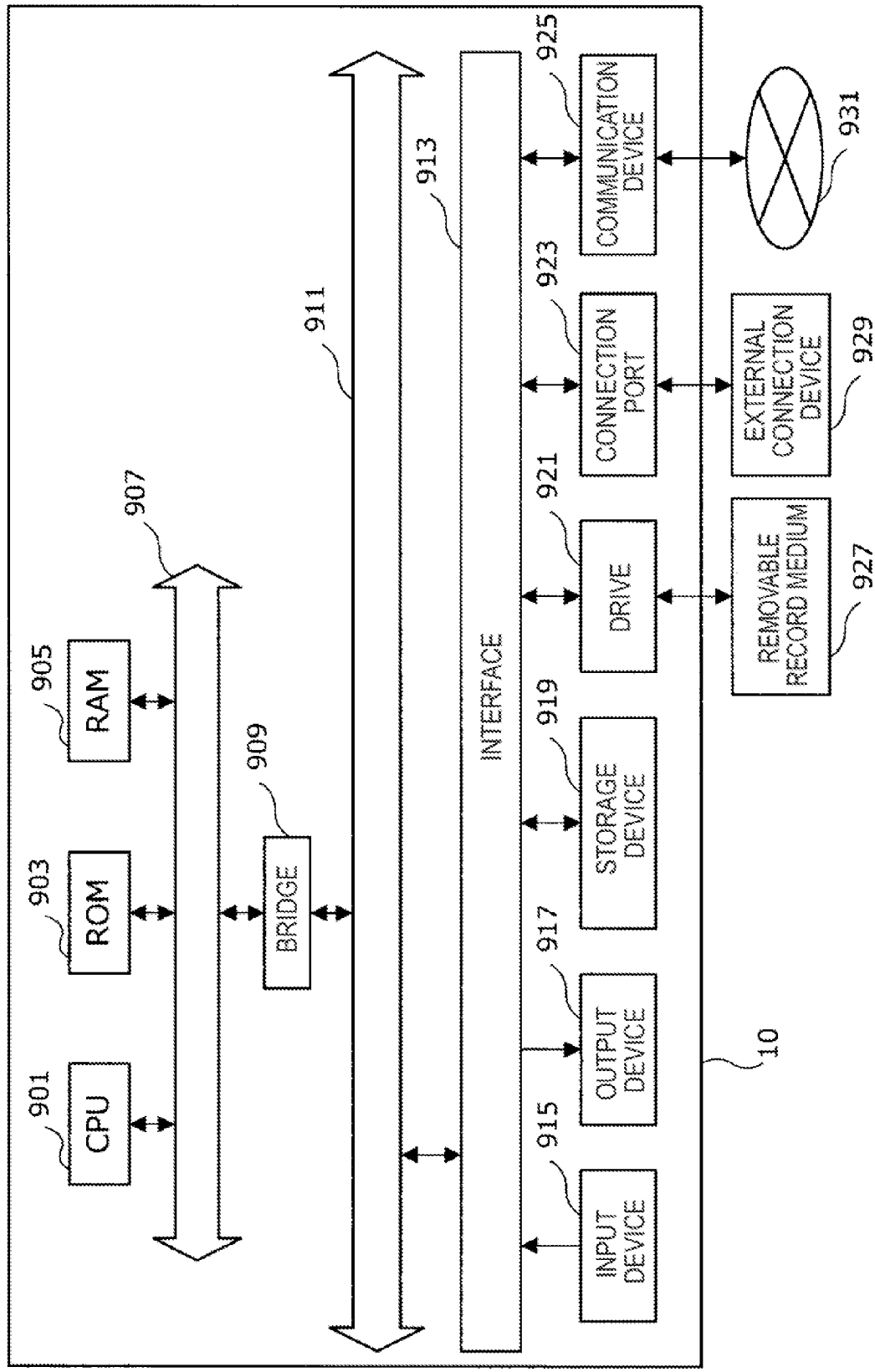
FIG. 21 is a block diagram showing an example of a hardware configuration of the information processing server according to an embodiment disclosed herein.

Now referring to FIG. 21, hardware configuration of the information processing server 10 according to the embodiment of the present disclosure will be described in detail. FIG. 21 is a block diagram for explaining the hardware configuration of the information processing server 10 according to the embodiment of the present disclosure.

The information processing server 10 includes mainly a CPU 901, a ROM 903 and a RAM 905. The information processing server 10 further includes a host bus 907, a bridge 909, an external bus 911, an interface 913, an input device 915, an output device 917, a storage device 919, a drive 921, a connection port 923 and a communicating device 925.

The CPU 901 functions as an arithmetic processing unit and a control device to control entire or a part of operation in the information processing server 10 in accordance with various kinds of programs recorded in the ROM 903, RAM 905, storage device 919 or removable record medium 927. The ROM 903 stores programs, operation parameters and the like used by the CPU 901. The RAM 905 temporarily stores programs used by the CPU 901, and parameters which are appropriately changed during executing the programs. These are connected to each other through a host bus 907 including an internal bus such as CPU bus.

The host bus 907 is connected to an external bus 911 such as PCI (peripheral component interconnect/interface) bus via a bridge 909.

The input device 915 is an operation device for allowing a user to operate thereon including, for example, a mouse, a keyboard, a touch panel, a button, a switch, a lever and the like. The input device 915 may be, for example, a remote control device (so-called, remote) which uses infrared light or other radio wave, or an external connection device 929 such as a mobile phone, a PDA or the like corresponding to the operation of the information processing server 10. The input device 915 further includes, for example, an input control circuit which generates an input signal based on information input by a user and outputs the same to the CPU 901 using the above-described operation device. By operating the input device 915, a user of the information processing server 10 is able to input various kinds of data to give an instruction of a processing operation to the information processing server 10.

The output device 917 includes a device which is capable of providing obtained information to a user in a visual or auditory manner. As such device, display devices including a CRT display device, a liquid crystal display device, a plasma display device, an EL display device and a lamp and the like; audio output devices such as speaker, head phone and the like; a printer unit; a mobile phone; a facsimile and the like are available. The output device 917 outputs, for example, a result obtained by various kinds of processing made by the information processing server 10. In particular, the display device displays the result of various kinds of processing made by the information processing server 10 in a form of text or an image. On other hand, an audio output device converts audio signals of reproduced voice data or acoustic data into analog signals and outputs the same.

The storage device 919 is an example of a storage device configured for storing data of the information processing server 10. The storage device 919 may be, for example, magnetic memory devices such as a HDD (hard disk drive), a semiconductor memory device, an optical memory device or an optical magnetic memory device. The storage device 919 stores a program executed by the CPU 901, various kinds of data, and various kinds of data obtained from the outside.

The drive 921 is a reader/writer for record medium, which is included in the information processing server 10 or externally provided thereto. The drive 921 reads information recorded in a magnetic disk, an optical disk, a magnetic optical disk, or a removable record medium 927 such as semiconductor memory or the like mounted thereon, and outputs the same to the RAM 905. The drive 921 can also write a record on a magnetic disk, an optical disk, a magnetic optical disk mounted thereon, or a removable record medium 927 such as semiconductor memory or the like. The removable record medium 927 may be, for example, a DVD media, a HD-DVD media, a Blu-ray media or the like. The removable record medium 927 may be a CompactFlash (registered mark), a flash memory, or an SD memory card (secure digital memory card) or the like. The removable record medium 927 may be, for example, an IC card (integrated circuit card) mounted with non-contact IC chip or an electronic device.

The connection port 923 is a port for directly connecting a device to the information processing server 10. As an example of the connection port 923, a USB (universal serial bus) port, an IEEE 1394 port, an SCSI (small computer system interface) port and the like are available. As another example of the connection port 923, an RS-232C port, an optical audio terminal, an HDMI (high-definition multimedia interface) port and the like are available. By connecting the external connection device 929 to the connection port 923, the information processing server 10 obtains various kinds of data directly from the external connection device 929 and provides various kinds of data to the external connection device 929.

The communicating device 925 is a communication interface including, for example, a communication device or the like for connecting to communication network 931. The communicating device 925 may be, for example, a wired or wireless LAN (local area network), Bluetooth (registered mark) or a communication card for WUSB (Wireless USB) or the like. The communicating device 925 may be a router for optical communication, a router for ADSL (asymmetric digital subscriber line) or a modem for various kinds of communication. The communicating device 925 is capable of transmitting and receiving signals via, for example, Internet or other communication device in accordance with a predetermined protocol like, for example, TCP/IP. The communication network 931 connected to the communicating device 925 may include a network or the like connected in a wired or wireless manner such as for example, Internet, a home LAN, an infrared communication, a radiofrequency communication or a satellite communication.

A example of hardware configurations capable of achieving the functions of the information processing server 10 according to the embodiment of the present disclosure has been described above. The above-described component elements may include a general purpose unit or circuit, or hardware each specialized to the functions of the component elements may be included. Therefore, the applied configuration may be appropriately changed in accordance with the technical art at the point when the embodiment is implemented.

The above-described hardware configuration of the information processing device 20 according to the embodiment of the present disclosure has the same configuration as the hardware configuration of the information processing server 10 according to the embodiment of the present disclosure. Therefore, detailed description is omitted here.

CONCLUSION

As described, in the embodiments of the present disclosure, the tag candidates that may correspond to the input data are extracted according to the methods as described above by using the predeterminedly created tree structure in an order with priority to tags with higher chances of being selected, and the extracted tag candidates are presented in a manner with which the user can more easily perform tagging. Due to this, according to the embodiments of the present disclosure, an amount of user's input procedures in the tagging process can be reduced, and the user's convenience can be improved.

Although the preferred embodiments of the present disclosure have been described in detail with reference to the appended drawings, the present disclosure is not limited thereto. It is obvious to those skilled in the art that various modifications or variations are possible insofar as they are within the technical scope of the appended claims or the equivalents thereof. It should be understood that such modifications or variations are also within the technical scope of the present disclosure.

Particular embodiments of the present technology include the following.

(1) An information processing system including: a processor for determining one or more candidate tags based on input data, the candidate tags being included within a hierarchical structure; and a display for displaying the candidate tags in a manner indicative of the candidate tags' positions in the hierarchical structure.

(2) The system according to (1), wherein the processor and display are implemented in a single device.

(3) The system according to (1), wherein the system comprises at least one information processing server and at least one information processing device, the processor being included in the information processing server, and the display being included in the information processing device.

(4) The system according to (1), wherein an evaluation value is generated for each candidate tag, the evaluation value being indicative of the candidate tag's correspondence with the input data.

(5) The system according to (4), wherein the candidate tags are displayed in order of descending evaluation values.

(6) The system according to (4), wherein the candidate tags are displayed in a manner that emphasizes selected candidate tags according to the evaluation values.

(7) The system according to (1), wherein the display simultaneously displays the candidate tags and the input data.

(8) The system according to (1), wherein the candidate tags are displayed in a tree format.

(9) The system according to (1), wherein the display simultaneously displays the candidate tags, the input data, and a candidate tag search box.

(10) The system according to (9), wherein as text is entered in the search box fewer candidate tags are displayed.

(11) The system according to (1), wherein the processor determines one or more candidate tags by determining a process target area of the input data and determining one or more candidate tags based on the process target area.

(12) The system according to (11), wherein the process target area is determined according to a manual input of a user.

(13) The system according to (11), wherein the process target area is determined automatically.

(14) The system according to (11), wherein the input data is image data and the processor performs an image recognition process to determine the process target area.

(15) The system according to (11), wherein the input data is text data and the processor performs a language recognition process to determine the process target area.

(16) The system according to (11), wherein the input data is sound data and the processor performs a sound recognition process to determine the process target area.

(17) The system according to (1), wherein, for each displayed candidate tag, a corresponding thumbnail image is displayed in the vicinity of the candidate tag.

(18) The system according to (1), wherein an object for initiating display of undisplayed tags is displayed with the displayed candidate tags.

(19) An information processing method including: determining one or more candidate tags based on input data, the candidate tags being included within a hierarchical structure; and displaying the candidate tags in a manner indicative of the candidate tags' positions in the hierarchical structure.

(20) A non-transitory computer-readable medium having stored thereon a computer-readable program for implementing an information processing method, the method including: determining one or more candidate tags based on input data, the candidate tags being included within a hierarchical structure; and displaying the candidate tags in a manner indicative of the candidate tags' positions in the hierarchical structure.

What is claimed is:

1. An information processing system comprising:
   a processor for determining one or more candidate tags based on input data, the candidate tags being included within a hierarchical structure; and
   a display for displaying the candidate tags in a manner indicative of the candidate tags' positions in the hierarchical structure,
   wherein the input data represents a photographic image of one or more objects such that the processor determines the one or more candidate tags included within the hierarchical structure which correspond to the one or more objects based on the photographic image, and
   wherein when a respective photographic image has a first object and a second object, the processor is configured to (i) detect a first process target area for the first object and detect a second process target area for the second object, (ii) determine a first candidate tag for the first process target area by utilizing a first procedure, and (iii) determine a second candidate tag for the second process target area by utilizing a second procedure which is different from the first procedure, in which one of the first procedure or the second procedure involves integrally determining results of a plurality of processing methods and selecting the respective candidate tag therefrom, wherein each processing method is individually capable of identifying a candidate tag and each said processing method is different from each other.

2. The system as recited in claim 1, wherein the processor and display are implemented in a single device.

3. The system as recited in claim 1, wherein the system comprises at least one information processing server and at least one information processing device, the processor being included in the information processing server, and the display being included in the information processing device.

4. The system as recited in claim 1, wherein an evaluation value is generated for each candidate tag, the evaluation value being indicative of the candidate tag's correspondence with the input data.

5. The system as recited in claim 4, wherein the candidate tags are displayed in order of descending evaluation values.

6. The system as recited in claim 4, wherein the candidate tags are displayed in a manner that emphasizes selected candidate tags according to the evaluation values.

7. The system as recited in claim 1, wherein the display simultaneously displays the candidate tags and the input data.

8. The system as recited in claim 1, wherein the candidate tags are displayed in a tree format.

9. The system as recited in claim 1, wherein the display simultaneously displays the candidate tags, the input data, and a candidate tag search box.

10. The system as recited in claim 1, wherein, for each displayed candidate tag, a corresponding thumbnail image is displayed in the vicinity of the candidate tag.

11. The system as recited in claim 1, in which one said processing method within the plurality of processing methods is an identifying process which utilizes a discriminator created by use of a machine learning technique.

12. An information processing method comprising:
    determining one or more candidate tags based on input data, the candidate tags being included within a hierarchical structure; and
    displaying the candidate tags in a manner indicative of the candidate tags' positions in the hierarchical structure,
    wherein the input data represents a photographic image of one or more objects such that the determining determines the one or more candidate tags included within the hierarchical structure which correspond to the one or more objects based on the photographic image, and
    wherein when a respective photographic image has a first object and a second object, the determining includes (i) detecting a first process target area for the first object and detecting a second process target area for the second object, (ii) determining a first candidate tag for the first process target area by utilizing a first procedure, and (iii) determining a second candidate tag for the second process target area by utilizing a second procedure which is different from the first procedure, in which one of the first procedure or the second procedure involves integrally determining results of a plurality of processing methods and selecting the respective candidate tag therefrom, wherein each processing method is individually capable of identifying a candidate tag and each said processing method is different from each other.

13. A non-transitory computer-readable medium having stored thereon a computer-readable program for implementing an information processing method, the method comprising:

determining one or more candidate tags based on input data, the candidate tags being included within a hierarchical structure; and displaying the candidate tags in a manner indicative of the candidate tags' positions in the hierarchical structure, wherein the input data is a photographic image of an object such that the determining determines the one or more candidate tags included within the hierarchical structure which correspond to the object based on the photographic image, and wherein when a respective photographic image has a first object and a second object, the determining includes (i) detecting a first process target area for the first object and detecting a second process target area for the second object, (ii) determining a first candidate tag for the first process target area by utilizing a first procedure, and (iii) determining a second candidate tag for the second process target area by utilizing a second procedure which is different from the first procedure, in which one of the first procedure or the second procedure involves integrally determining results of a plurality of processing methods and selecting the respective candidate tag therefrom, wherein each processing method is individually capable of identifying a candidate tag and each said processing method is different from each other.

14. An information processing system comprising:

a processor to receive data representative of one or more objects and to select a number of candidate tags from among a plurality of candidate tags arranged in a first hierarchical structure which correspond to the one or more objects; and a display to display the selected candidate tag or tags in a second hierarchical structure in a manner so as to indicate a respective position therein for each of the selected candidate tag or tags, said second hierarchical structure being different from said first hierarchical structure, wherein when a respective photographic image has a first object and a second object, the processor is configured to (i) detect a first process target area for the first object and detect a second process target area for the second object, (ii) determine a first candidate tag for the first process target area by utilizing a first procedure, and (iii) determine a second candidate tag for the second process target area by utilizing a second procedure which is different from the first procedure, in which one of the first procedure or the second procedure involves integrally determining results of a plurality of processing methods and selecting the respective candidate tag therefrom, wherein each processing method is individually capable of identifying a candidate tag and each said processing method is different from each other.

15. The information processing system according to claim 14, in which said second hierarchical structure has fewer candidate tags than that of said first hierarchical structure.

* * * * *